(12) United States Patent
Kawaguchi et al.

(10) Patent No.: US 12,429,723 B2
(45) Date of Patent: Sep. 30, 2025

(54) SUPPORTING BODY AND DISPLAY APPARATUS

(71) Applicant: Saturn Licensing LLC, New York, NY (US)

(72) Inventors: Kazunori Kawaguchi, Kanagawa (JP); Atsushi Tokumi, Kanagawa (JP); Masayasu Watanabe, Tokyo (JP); Toshiaki Takahashi, Tochigi (JP); Hiroaki Yokota, Tokyo (JP); Takahiro Naito, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 117 days.

(21) Appl. No.: 18/028,300

(22) PCT Filed: Sep. 29, 2021

(86) PCT No.: PCT/JP2021/036006
§ 371 (c)(1),
(2) Date: Mar. 24, 2023

(87) PCT Pub. No.: WO2022/075160
PCT Pub. Date: Apr. 14, 2022

(65) Prior Publication Data
US 2023/0418096 A1 Dec. 28, 2023

(30) Foreign Application Priority Data
Oct. 8, 2020 (JP) ................................. 2020-170685

(51) Int. Cl.
*G02F 1/1333* (2006.01)
*F16M 11/04* (2006.01)
(Continued)

(52) U.S. Cl.
CPC ..... *G02F 1/133325* (2021.01); *F16M 11/041* (2013.01); *F16M 11/046* (2013.01);
(Continued)

(58) Field of Classification Search
CPC ... F16M 11/046; F16M 2200/08; H04N 5/655
See application file for complete search history.

(56) References Cited

U.S. PATENT DOCUMENTS 12,075,581 B2 * 8/2024 Matsuoka ............ H05K 5/0204
2002/0014619 A1  2/2002 Christensen et al.
(Continued)

FOREIGN PATENT DOCUMENTS

CN  103489371      1/2014
CN  204083689 U    1/2015
(Continued)

OTHER PUBLICATIONS

International Search Report for PCT/JP2021/036006 mailed Dec. 7, 2021. 4 pgs.

*Primary Examiner* — Alexander P Gross
(74) *Attorney, Agent, or Firm* — Richard LaPeruta

(57) ABSTRACT

A supporting body is provided that is able to select a form of support to a display unit in accordance with a user's purpose or preference, an installation environment, or the like. The supporting body supports a display unit including a display section, a first mounting section, and a second mounting section to cause the display unit to stand on a placement surface in a first direction. The display section has a display surface that spreads in each of the first direction and a second direction, and the first mounting section and the second mounting section are disposed side by side in the first direction. The supporting body includes a first supporting unit that is formed detachably on the first mounting (Continued)

section, and a second supporting unit that is formed detachably on the second mounting section.

21 Claims, 27 Drawing Sheets

(51) Int. Cl.
  *F16M 11/16* (2006.01)
  *F16M 11/22* (2006.01)
(52) U.S. Cl.
  CPC ............. *F16M 11/16* (2013.01); *F16M 11/22* (2013.01); *G02F 1/133328* (2021.01); *F16M 2200/08* (2013.01)

(56) References Cited

U.S. PATENT DOCUMENTS

| | | | |
|---|---|---|---|
| 2006/0208145 A1* | 9/2006 | Chen | F16M 11/046 248/289.11 |
| 2007/0047188 A1 | 3/2007 | Kim | |
| 2007/0145212 A1 | 6/2007 | Yamanaka | |
| 2010/0309618 A1* | 12/2010 | Park | F16M 11/24 361/679.01 |
| 2018/0302995 A1* | 10/2018 | Hasegawa | G06F 1/1601 |

FOREIGN PATENT DOCUMENTS

| | | | |
|---|---|---|---|
| CN | 105697950 A | * | 6/2016 |
| CN | 108205234 A | * | 6/2018 |
| JP | H11331735 A | | 11/1999 |
| JP | 2001042779 A | | 2/2001 |
| JP | 2004086046 A | | 3/2004 |
| JP | 2004309906 A | | 11/2004 |
| JP | 2010015098 A | | 1/2010 |
| JP | 2011244258 A | | 12/2011 |
| JP | 2012141385 A | | 7/2012 |
| JP | 2019120709 A | | 7/2019 |
| JP | 2019220912 A | | 12/2019 |
| KR | 20140010571 | | 1/2014 |
| KR | 20200028083 | | 3/2020 |
| WO | 2008046325 | | 4/2008 |
| WO | 2017098711 A1 | | 6/2017 |
| WO | 2020137333 A1 | | 7/2020 |

* cited by examiner

[FIG. 1A]
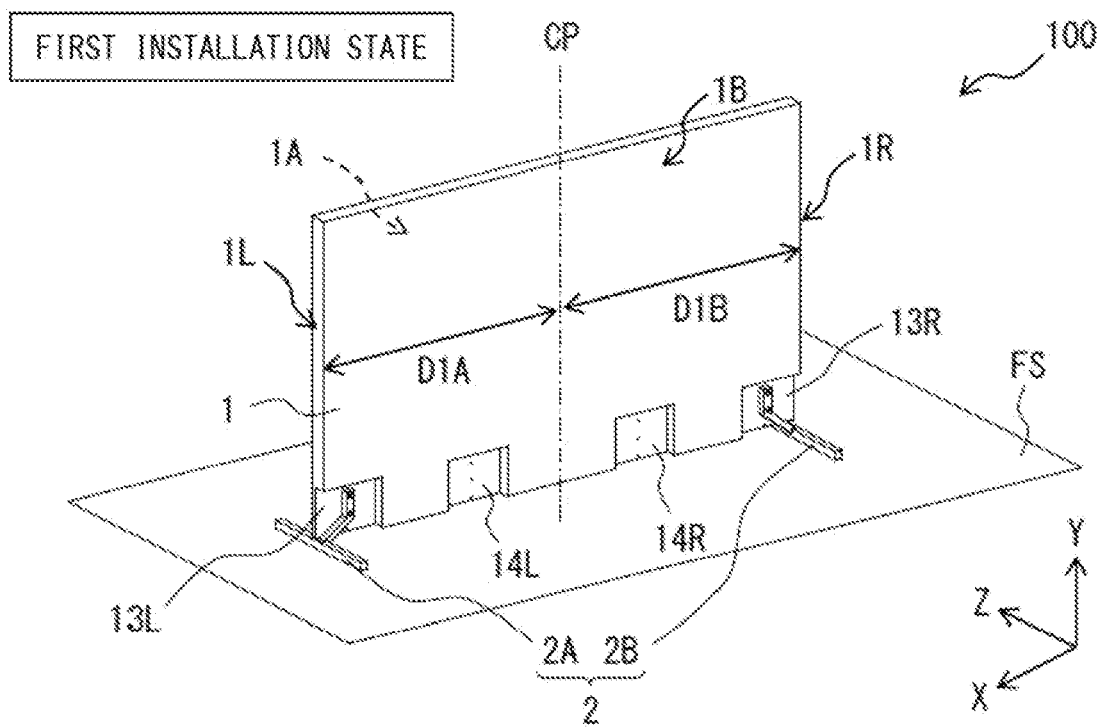
[FIG. 1B]
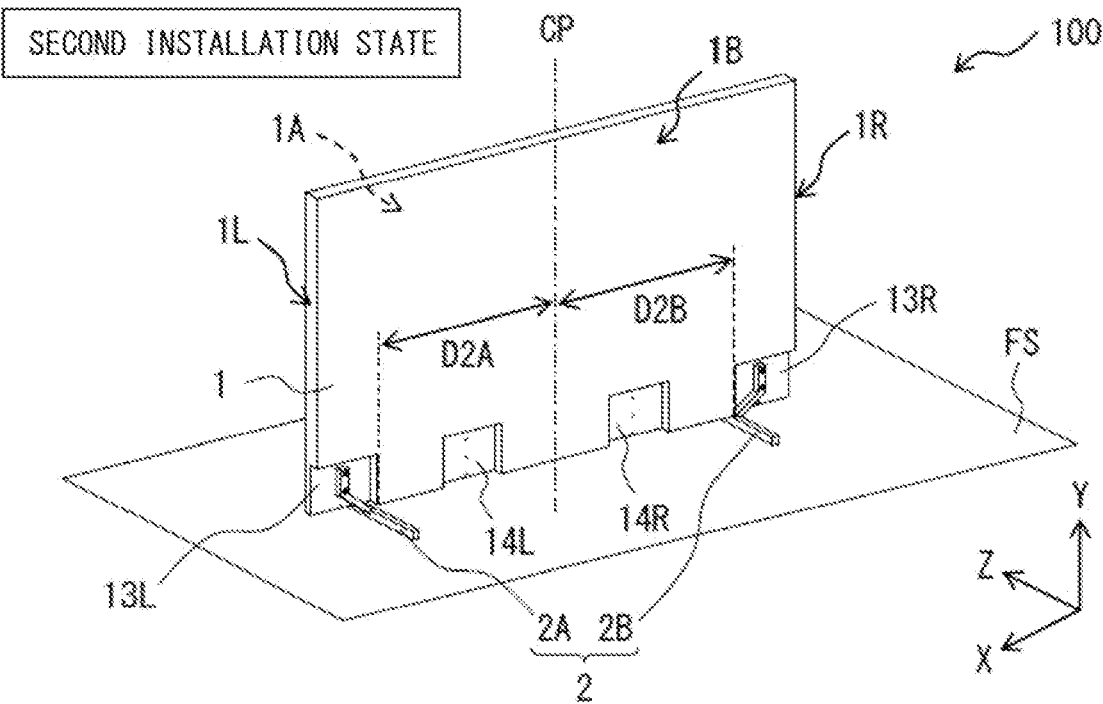

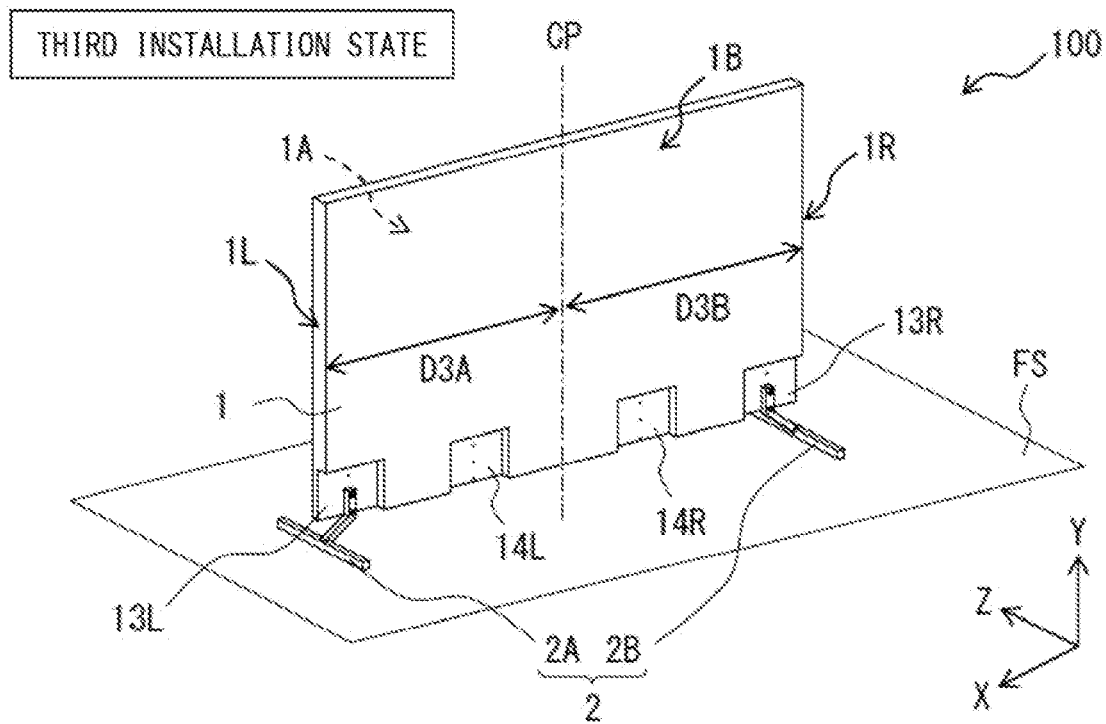
[FIG. 1C]
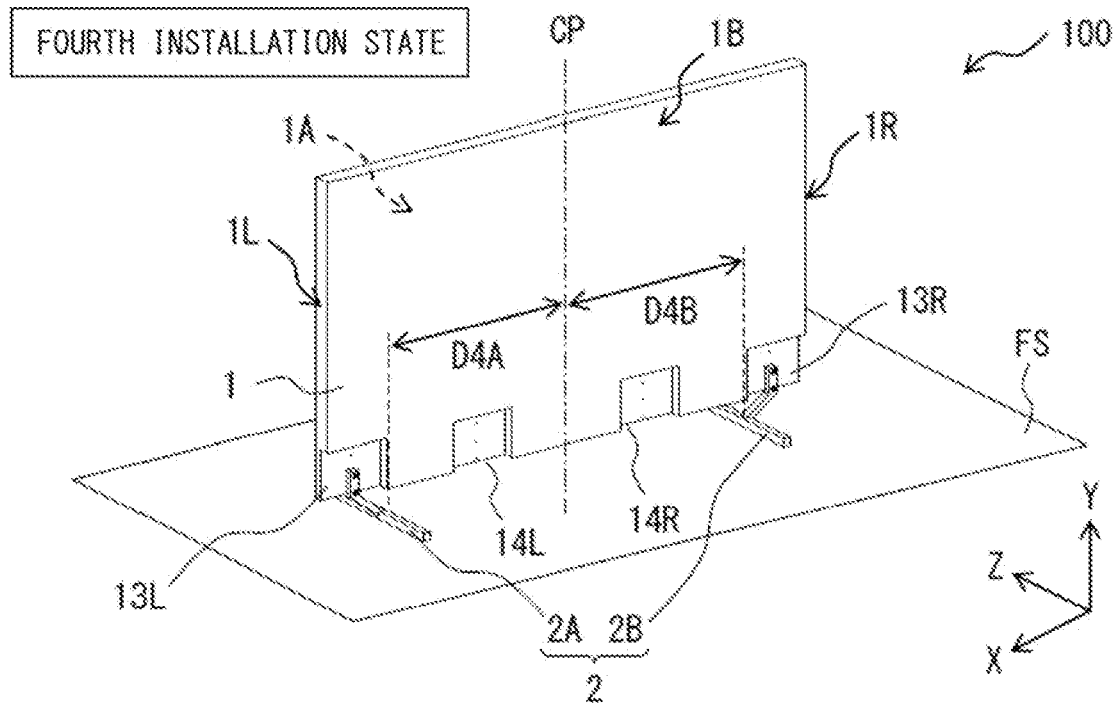
[FIG. 1D]

[FIG. 1E]
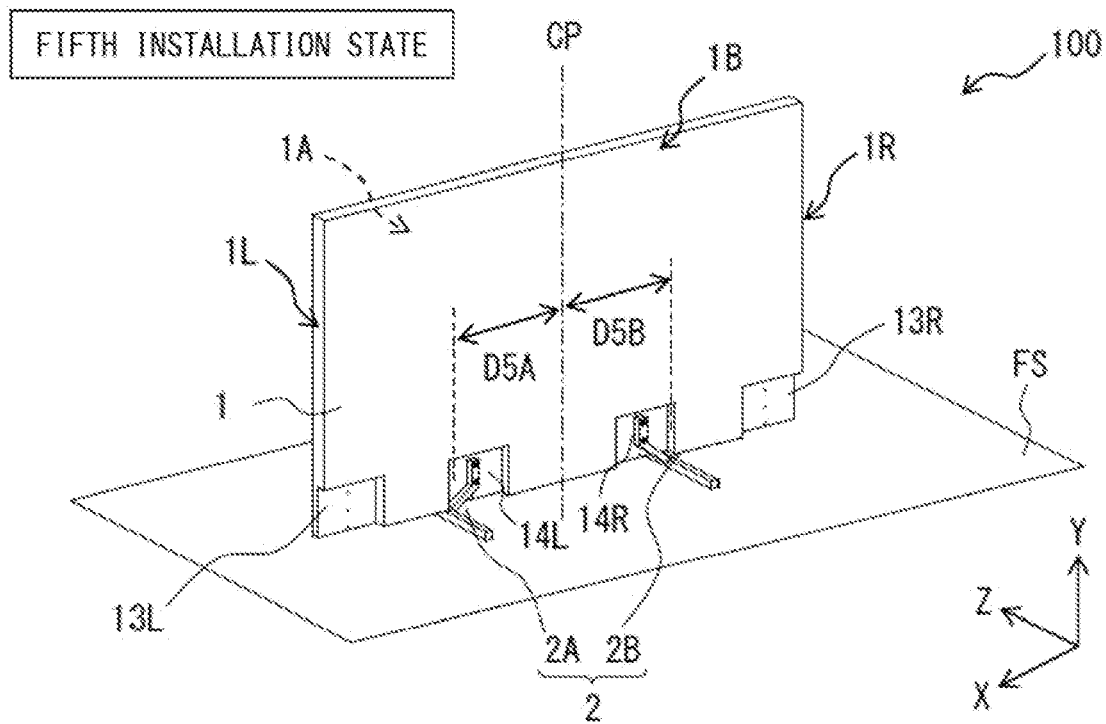
[FIG. 1F]
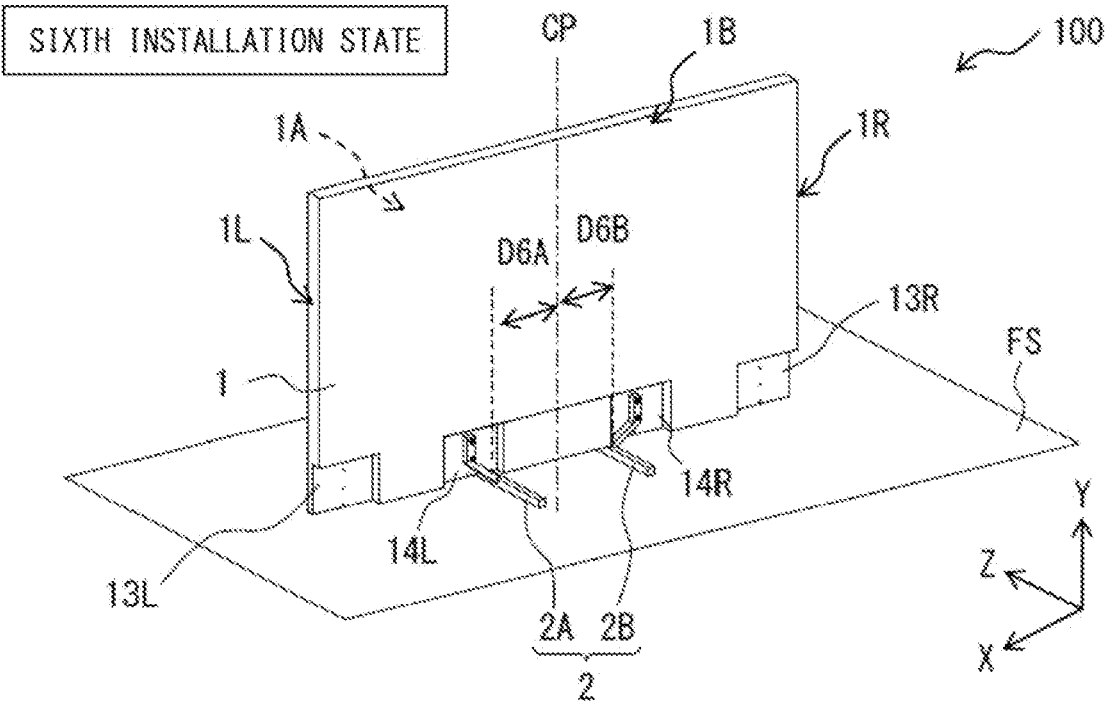

[FIG. 1G]
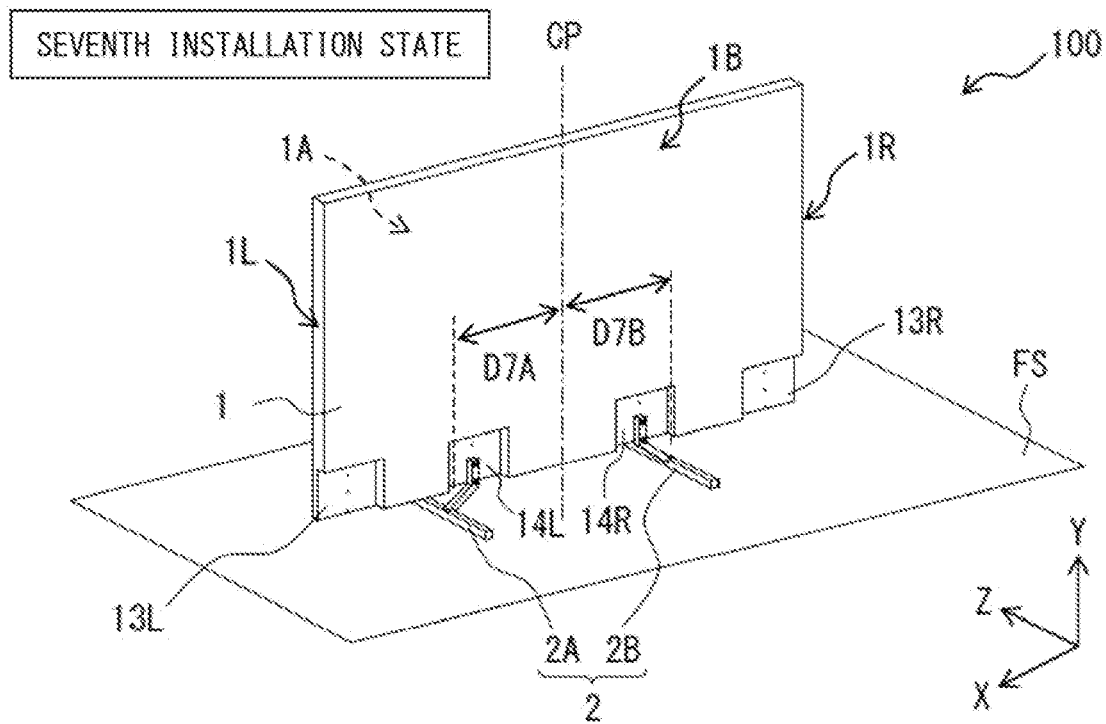
[FIG. 1H]
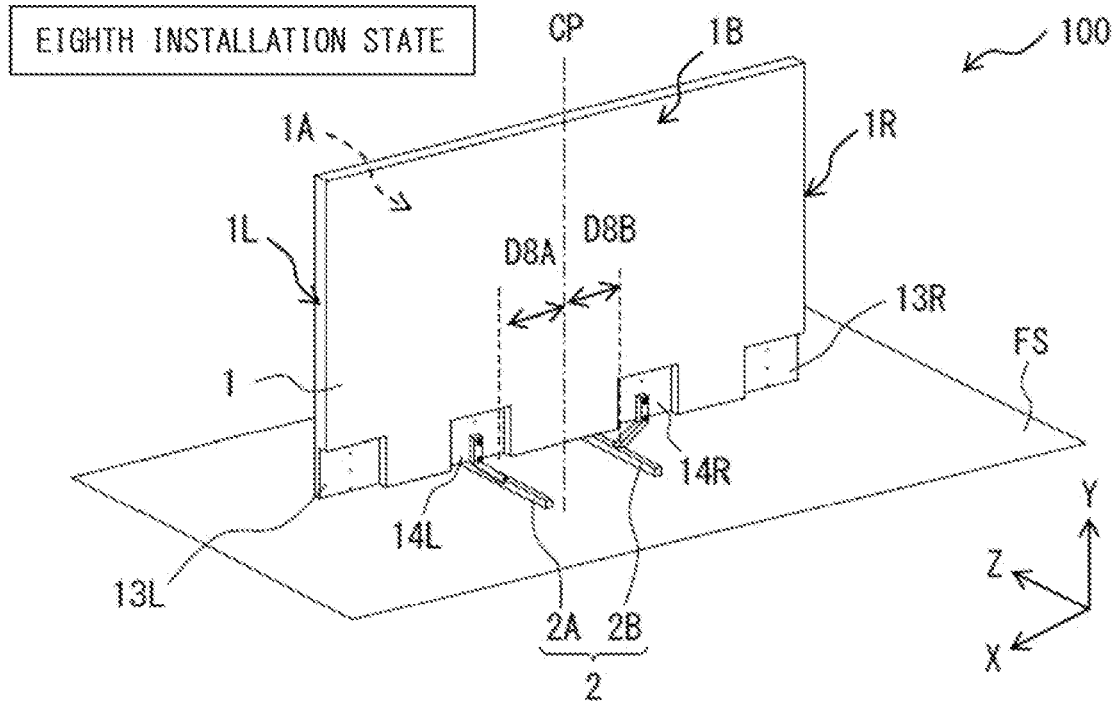

[FIG. 2A]
FIRST INSTALLATION STATE
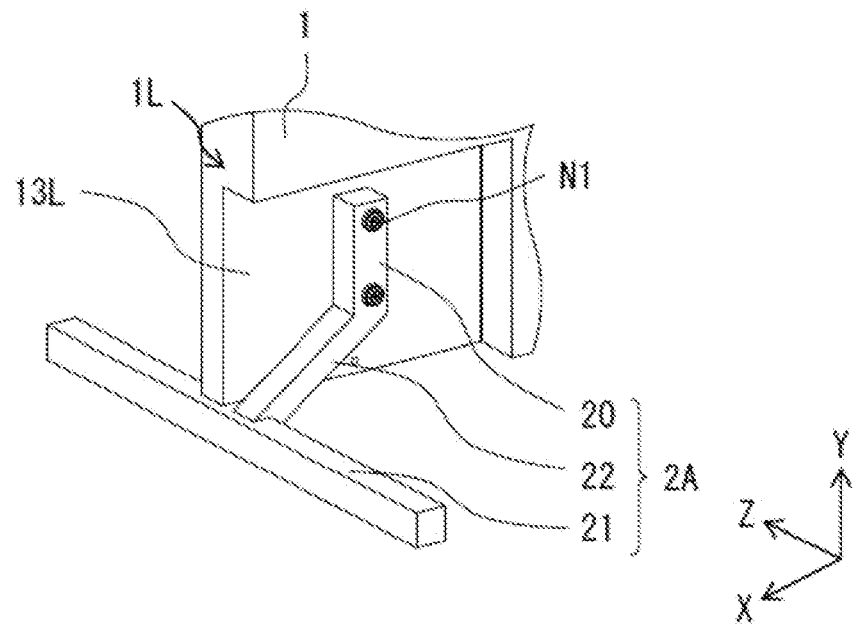
[FIG. 2B]
FIRST INSTALLATION STATE
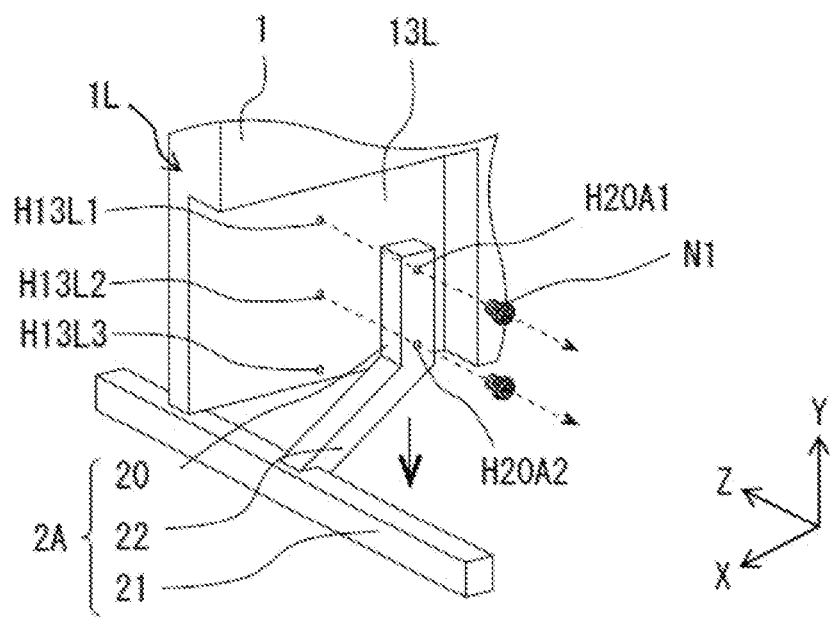

[FIG. 3A]
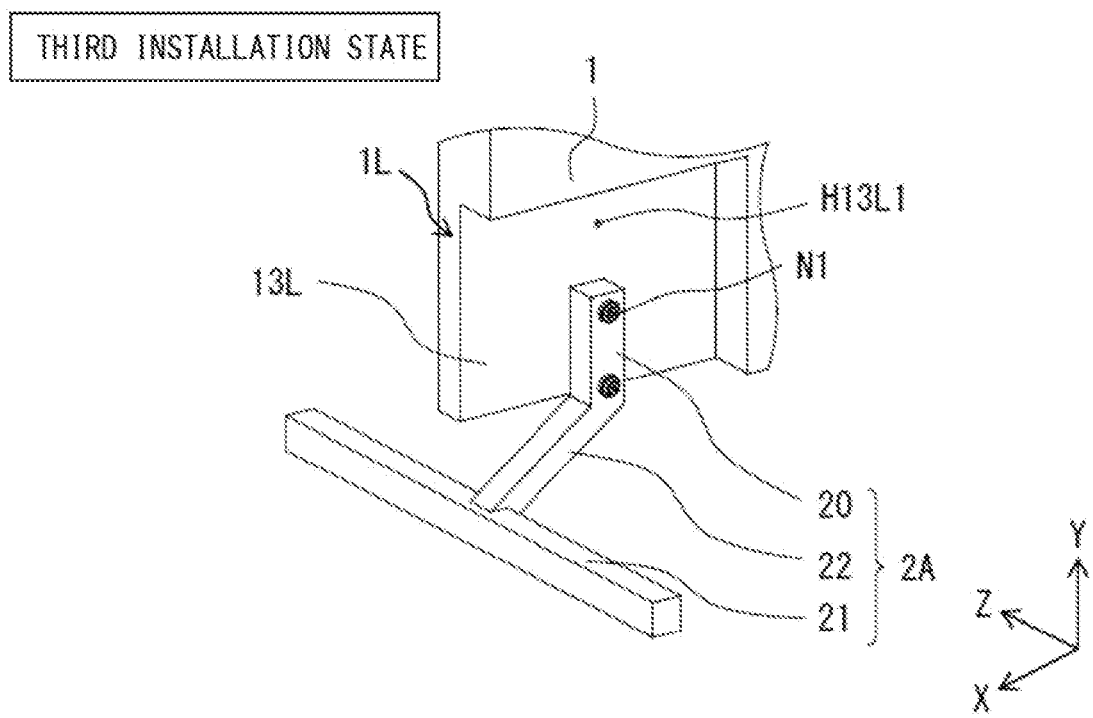
[FIG. 3B]
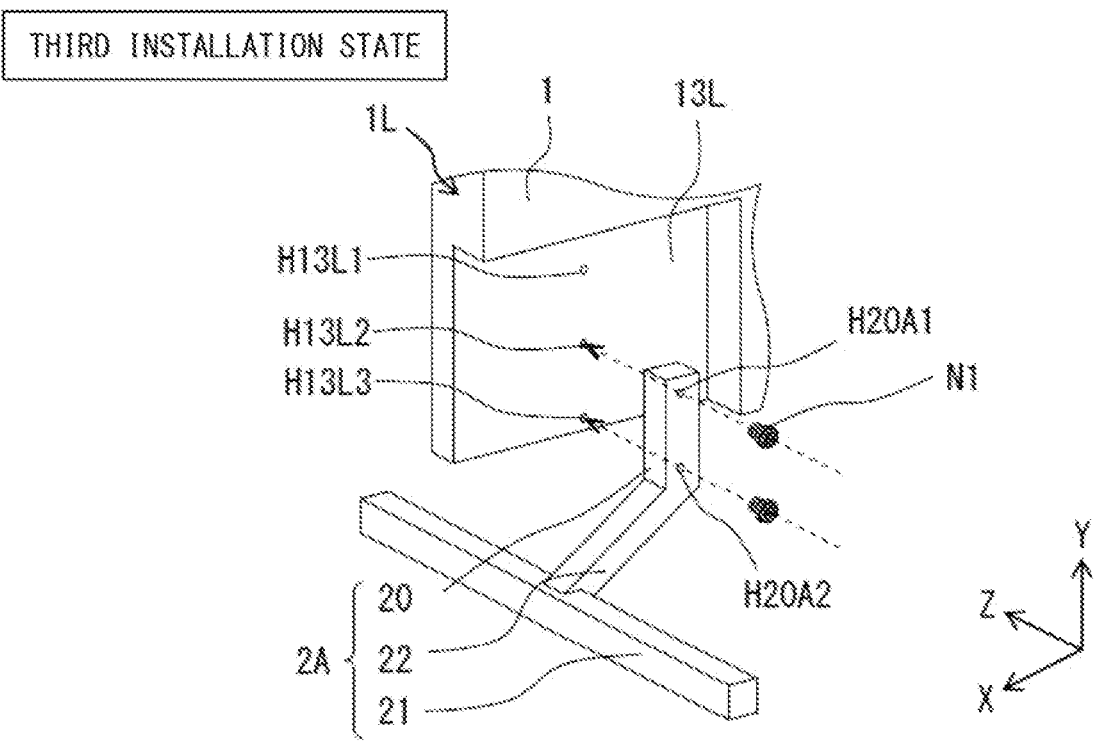

[FIG. 4A]
SECOND INSTALLATION STATE
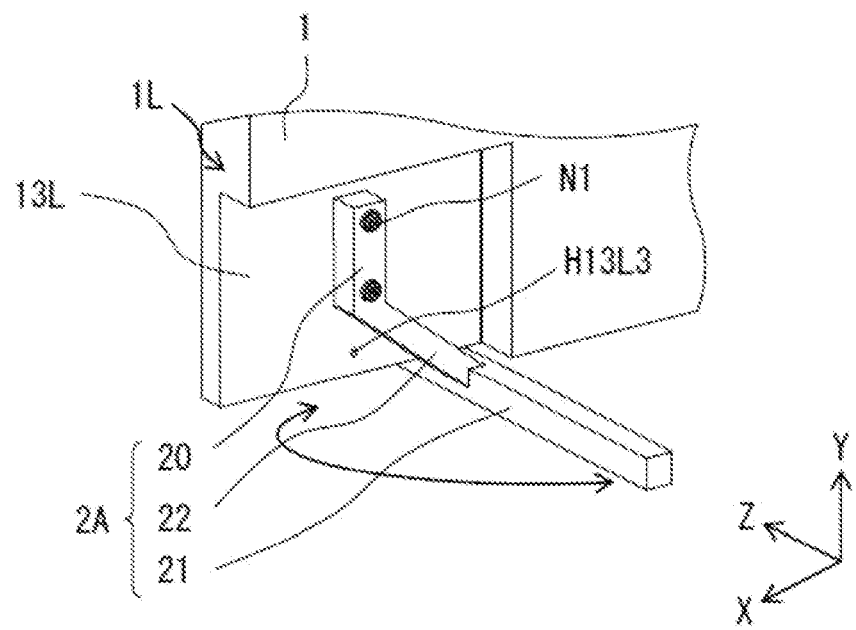
[FIG. 4B]
SECOND INSTALLATION STATE
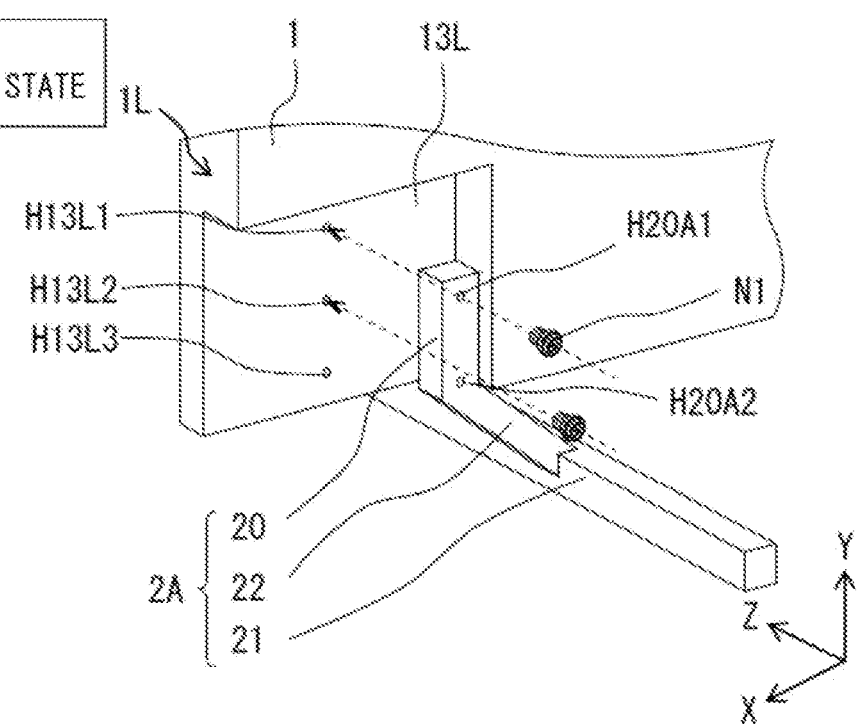

[FIG. 5A]
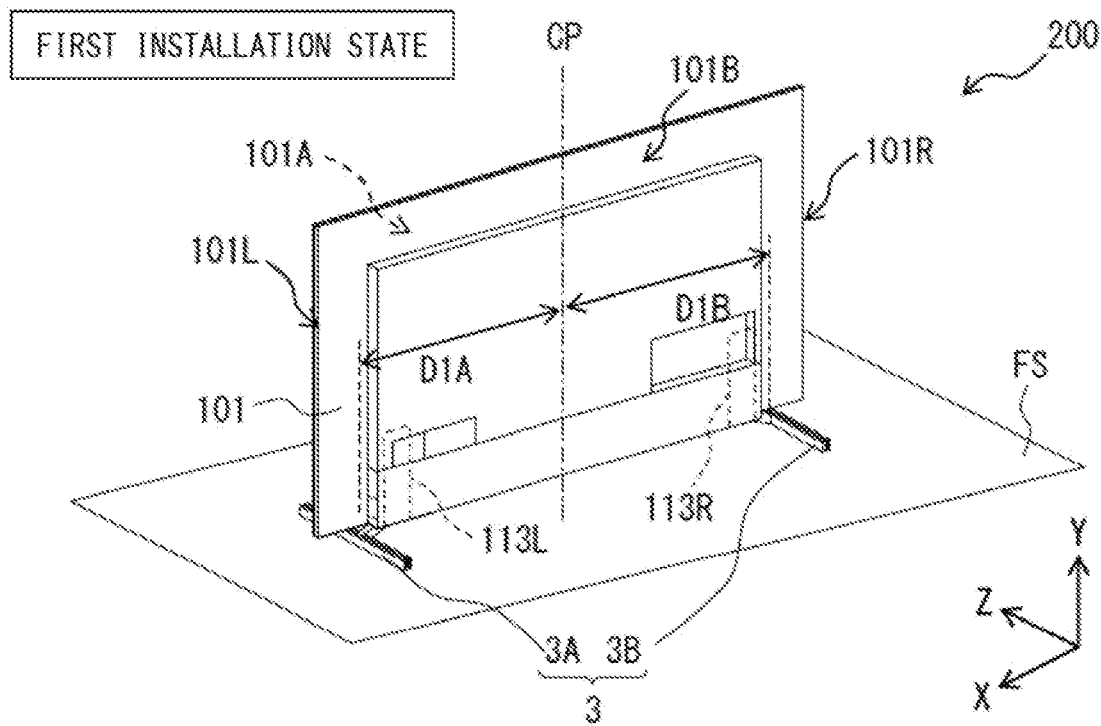
[FIG. 5B]
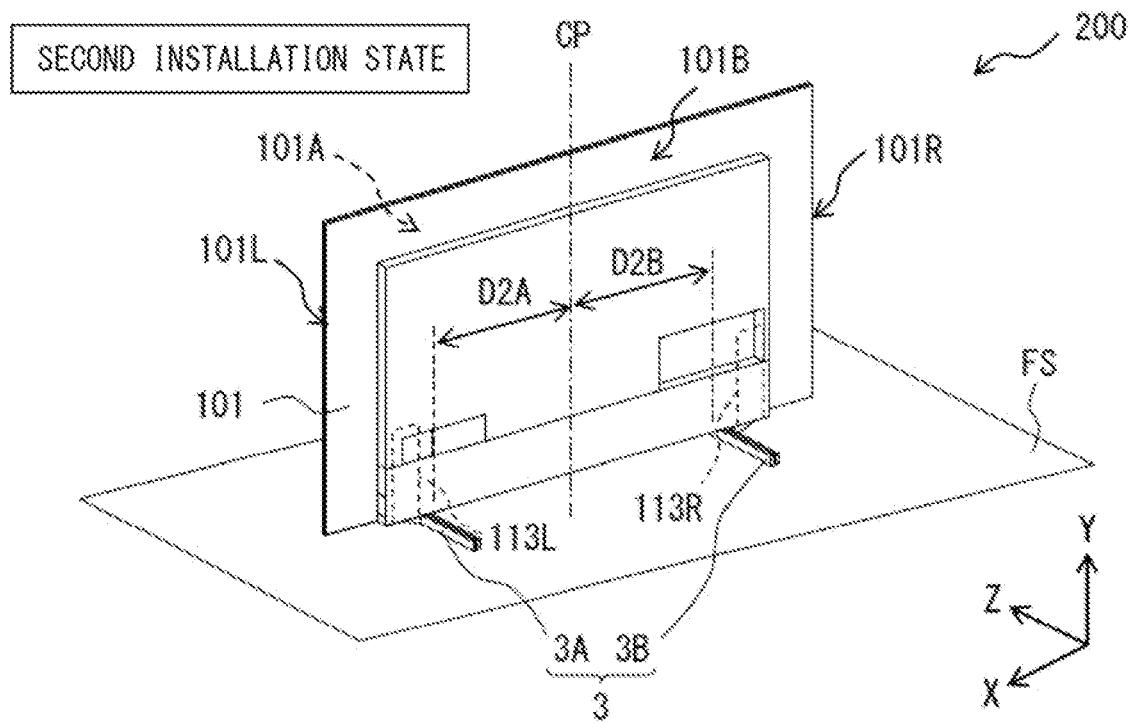

[FIG. 5C]
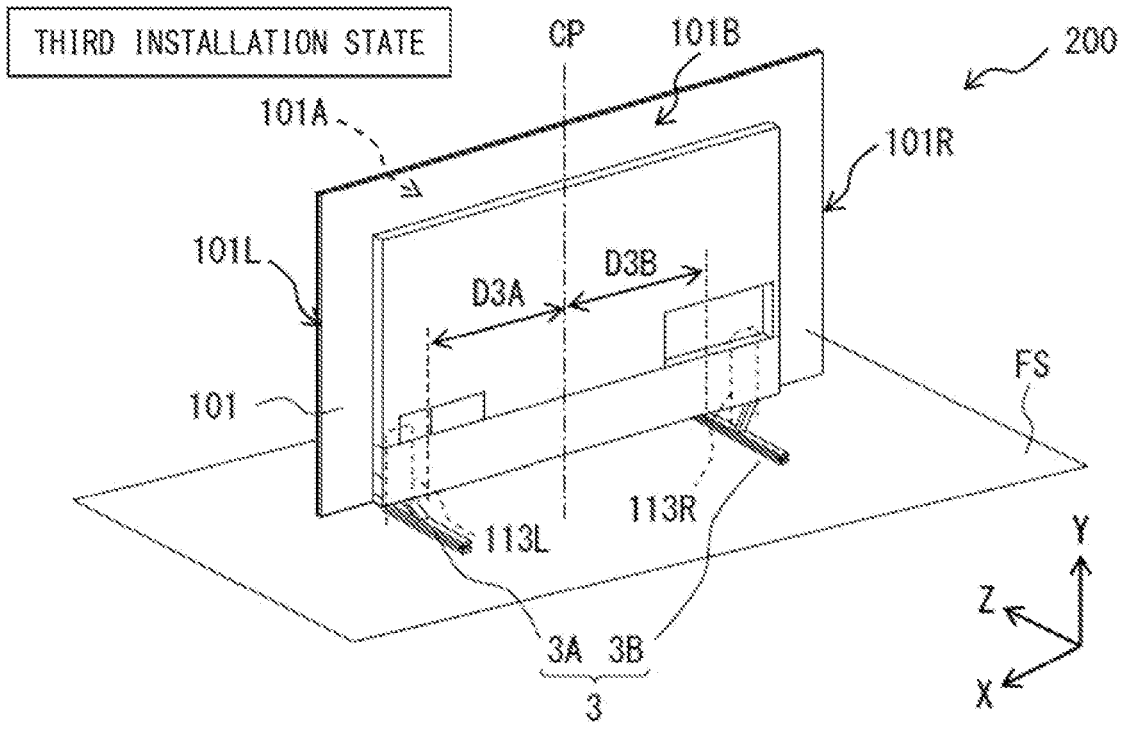
[FIG. 5D]
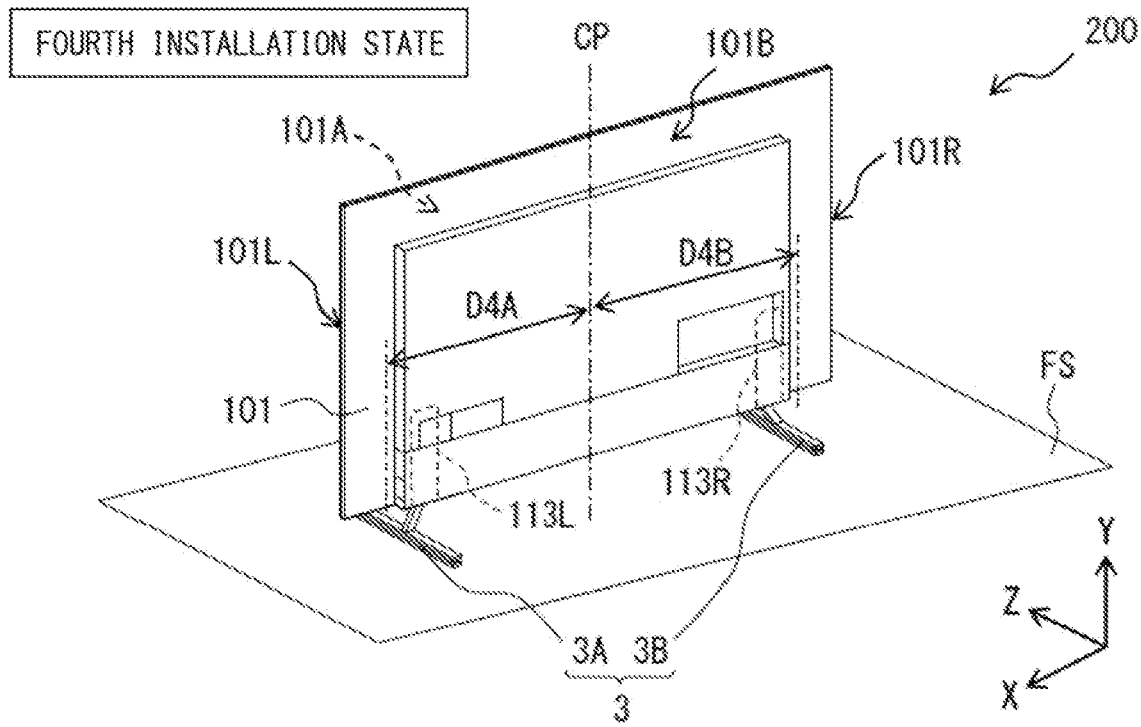

[ FIG. 6A ]
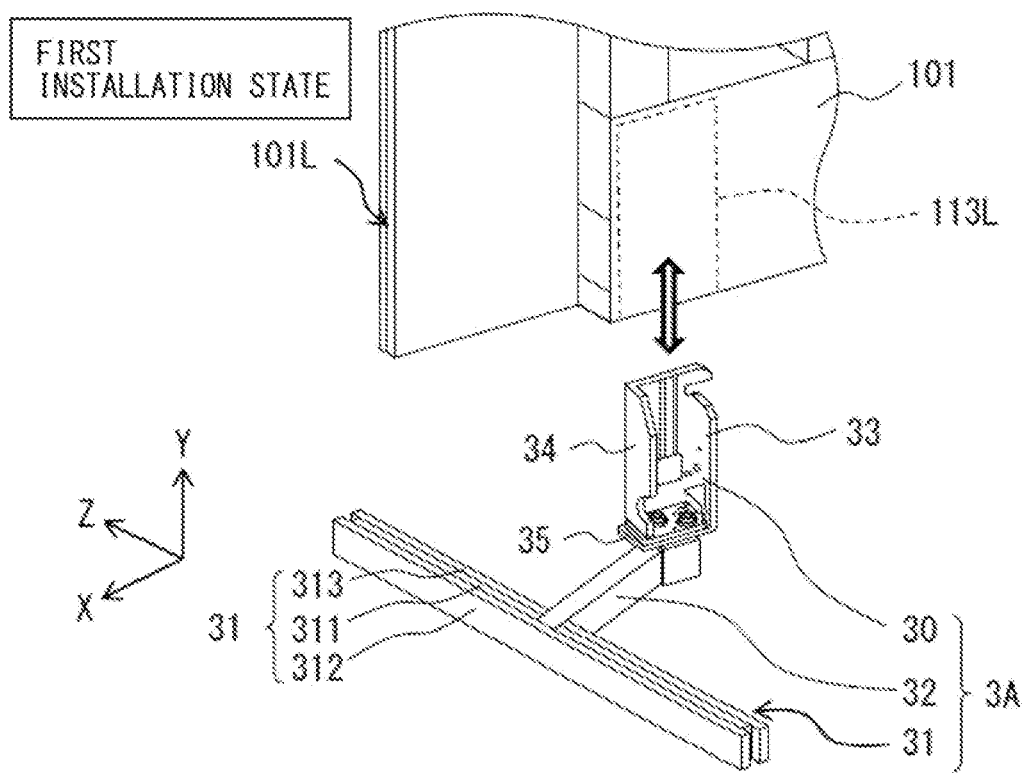
[ FIG. 6B ]
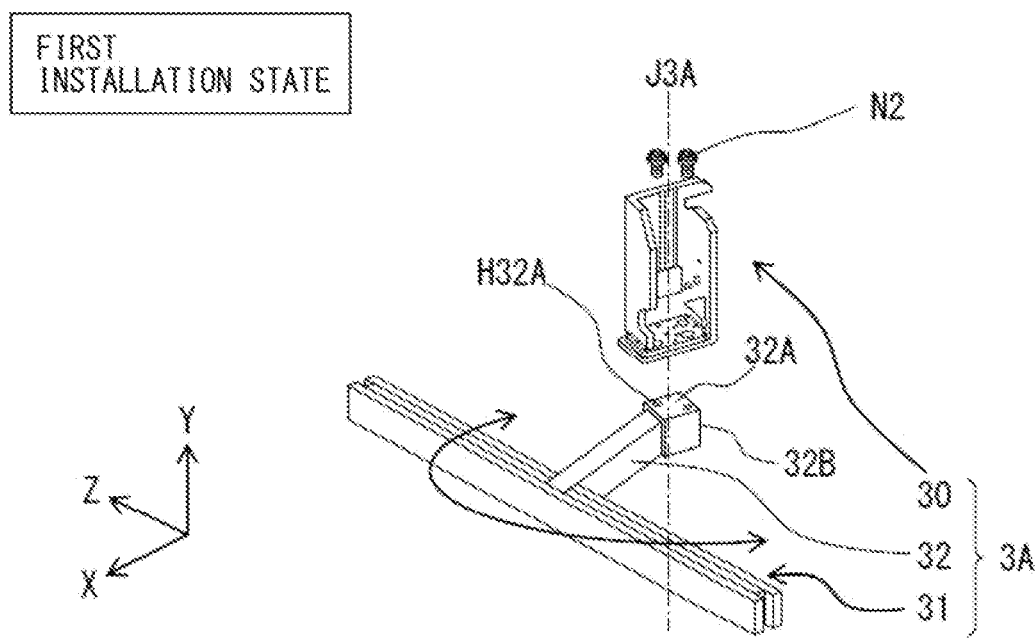

[FIG. 7A]
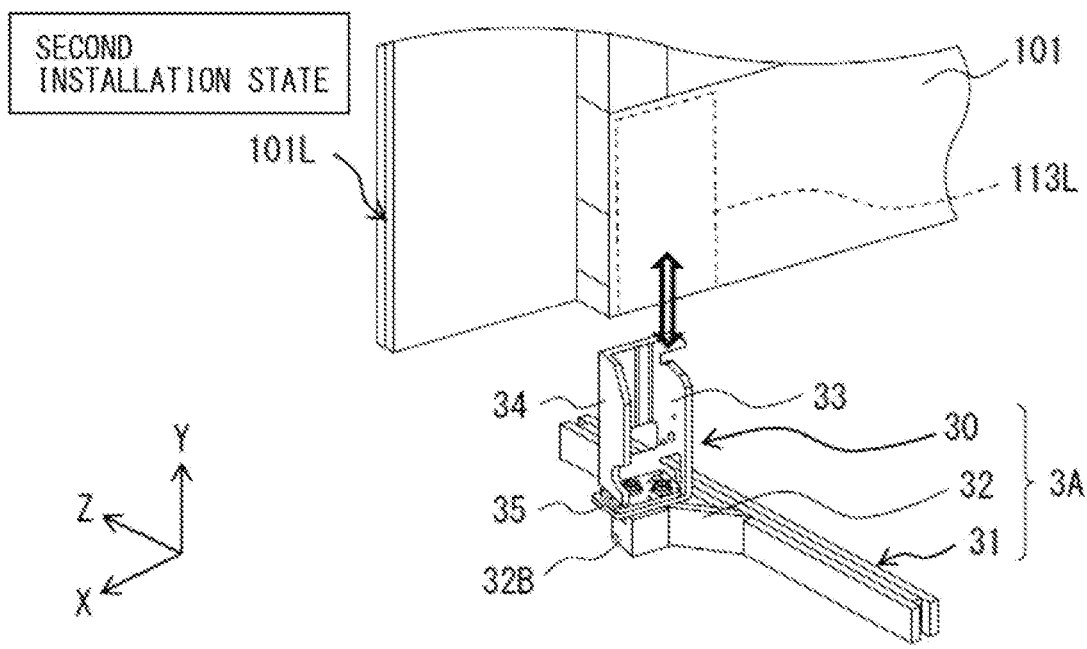
[FIG. 7B]
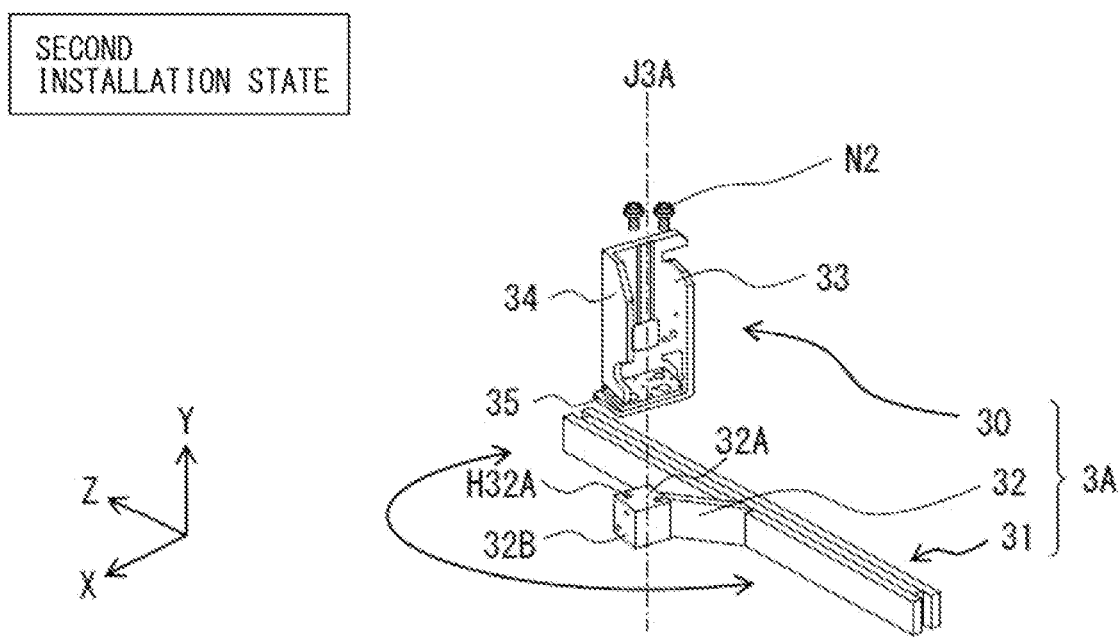

[FIG. 8A]
FOURTH INSTALLATION STATE
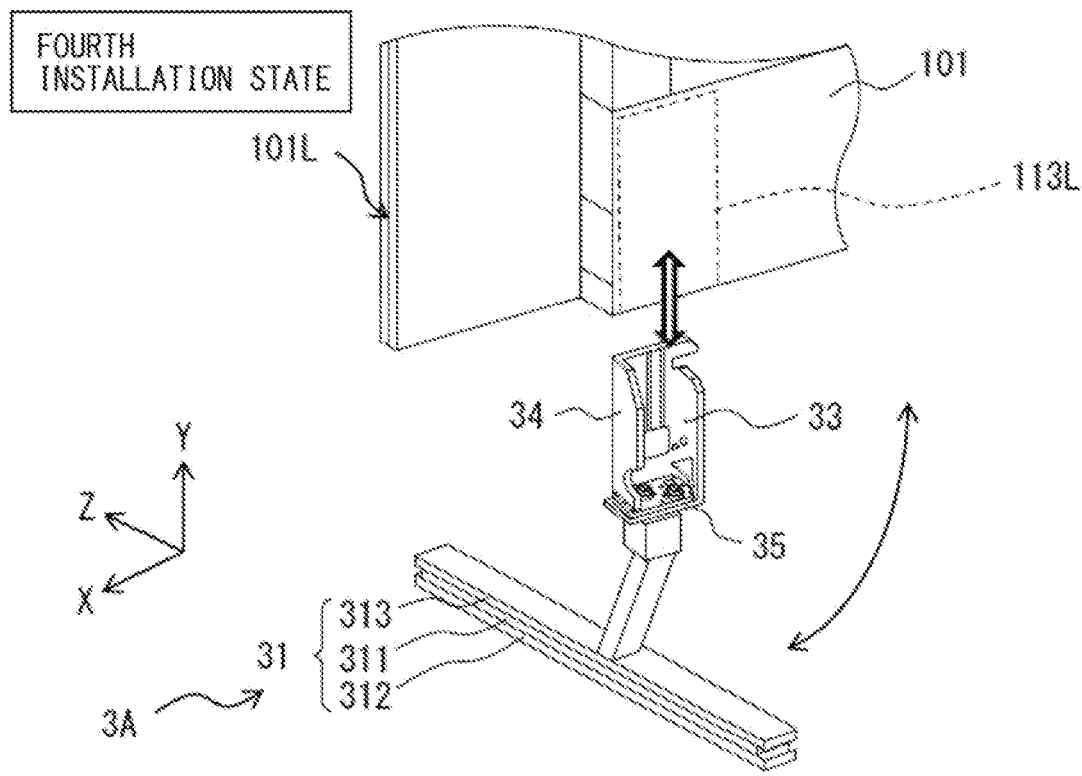
[FIG. 8B]
FOURTH INSTALLATION STATE
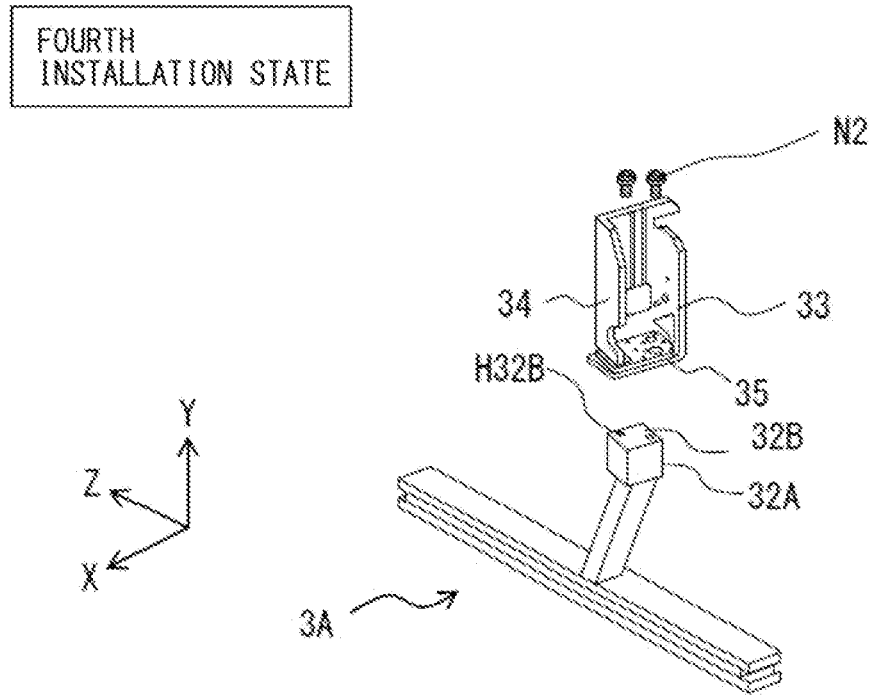

[FIG. 9A]
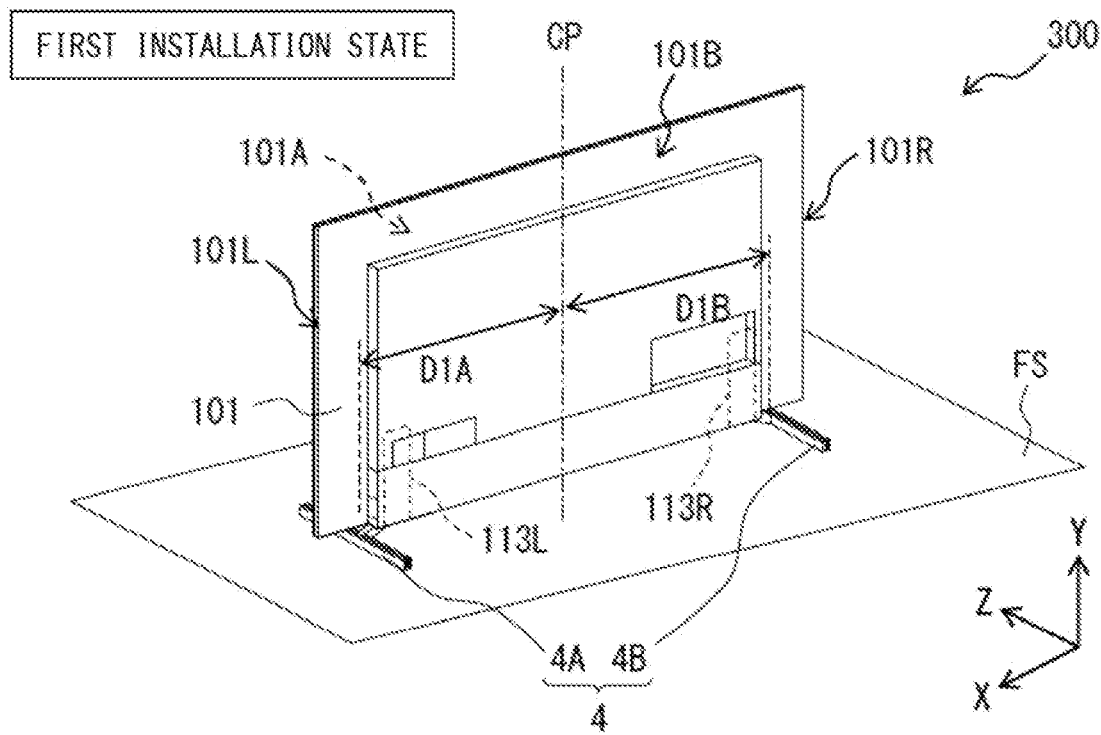
[FIG. 9B]
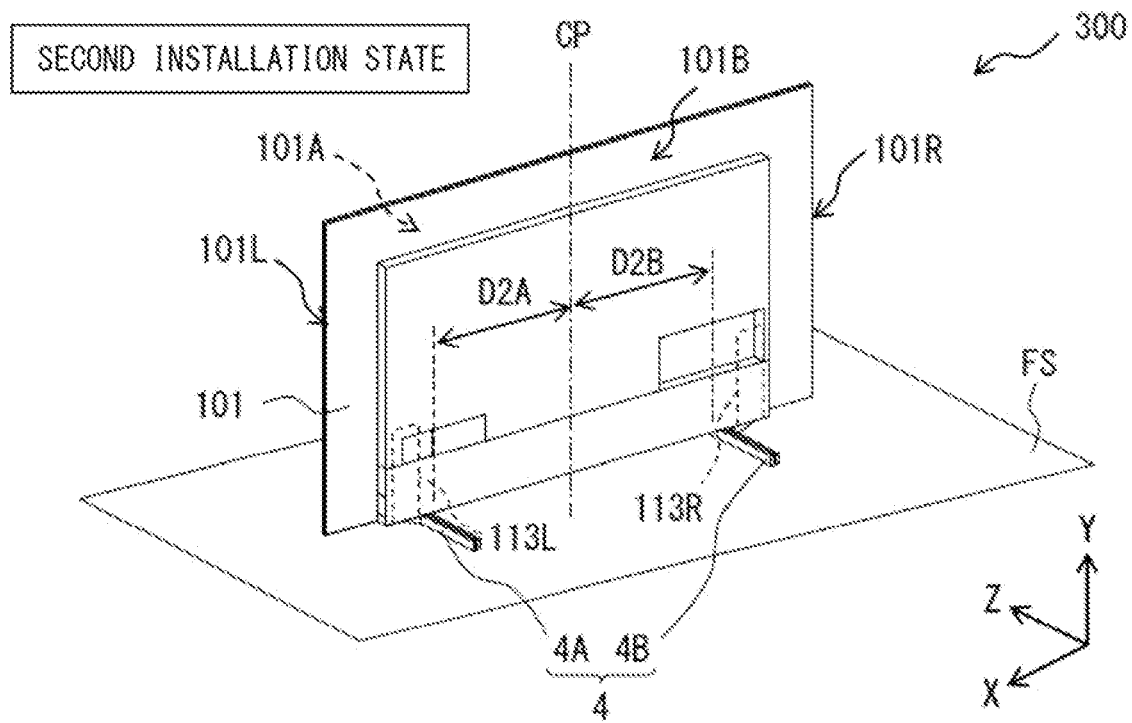

[FIG. 9C]
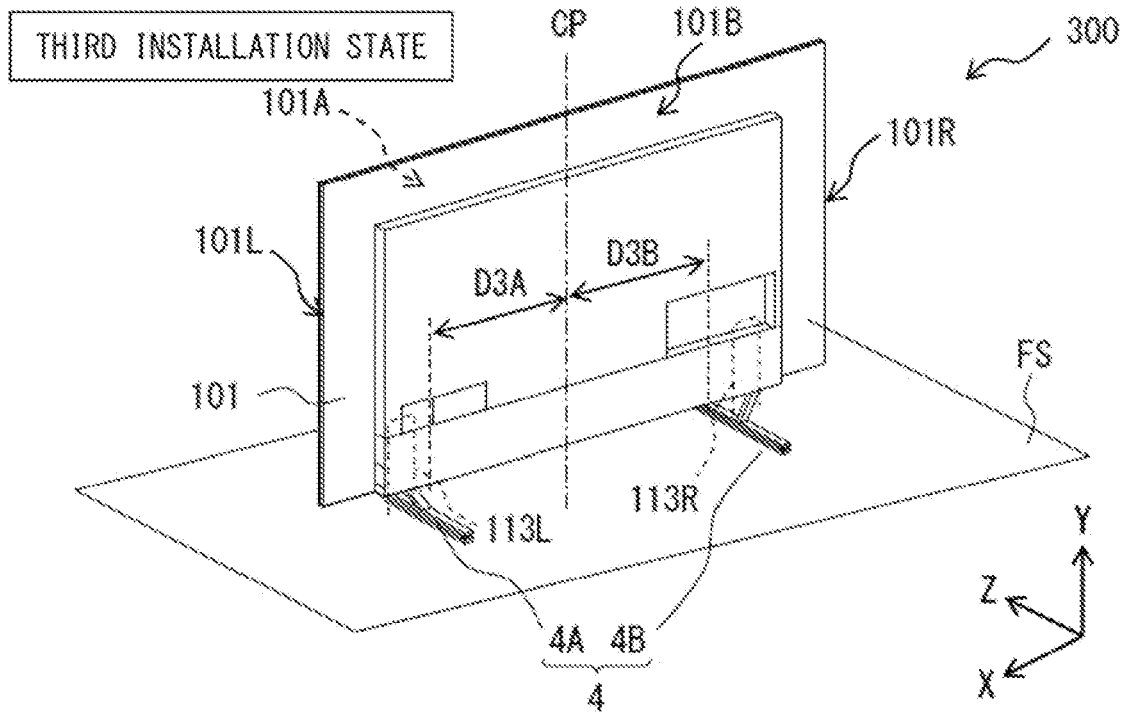
[FIG. 9D]
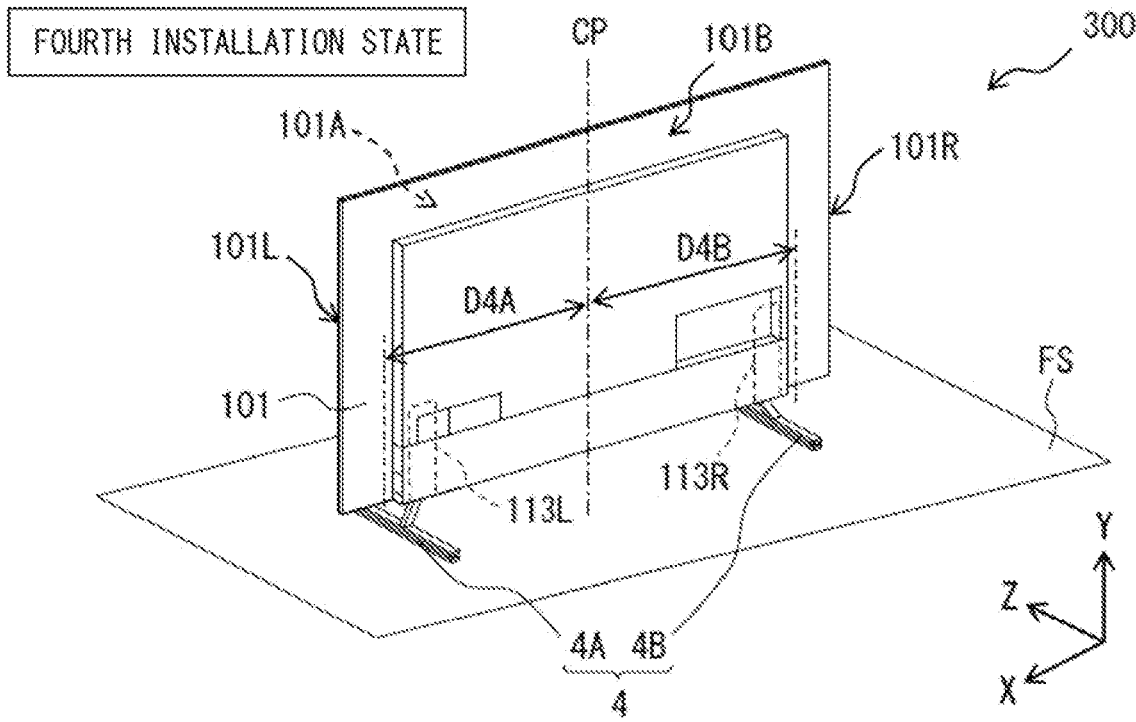

[FIG. 10A]
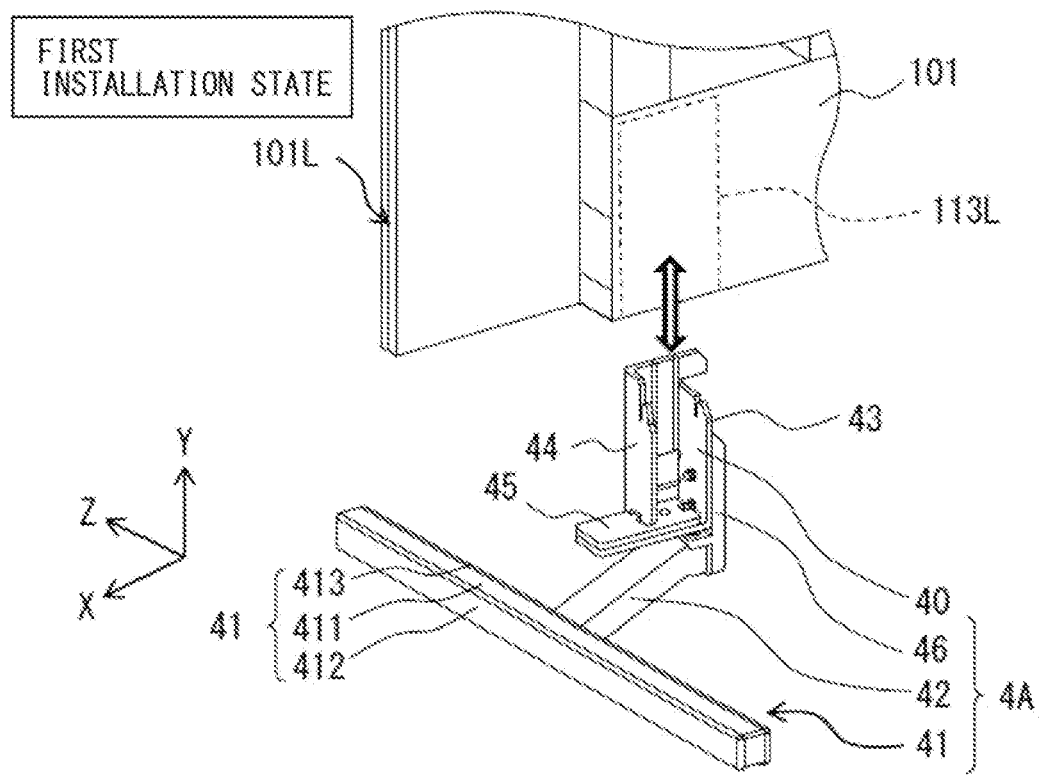
FIRST INSTALLATION STATE
[FIG. 10B]
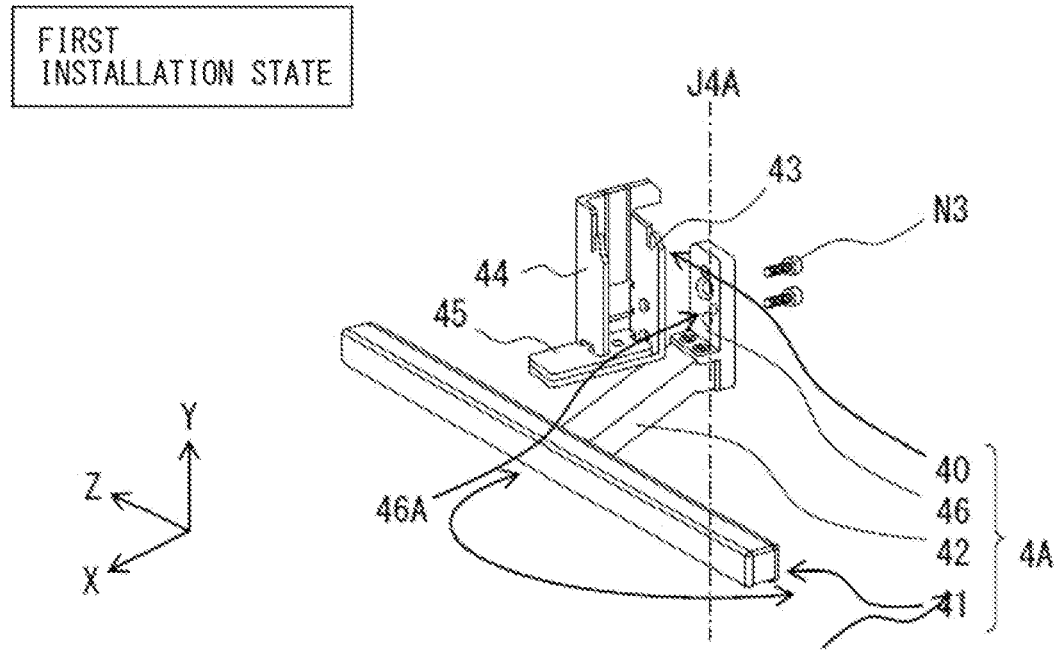
FIRST INSTALLATION STATE

[ FIG. 11A ]
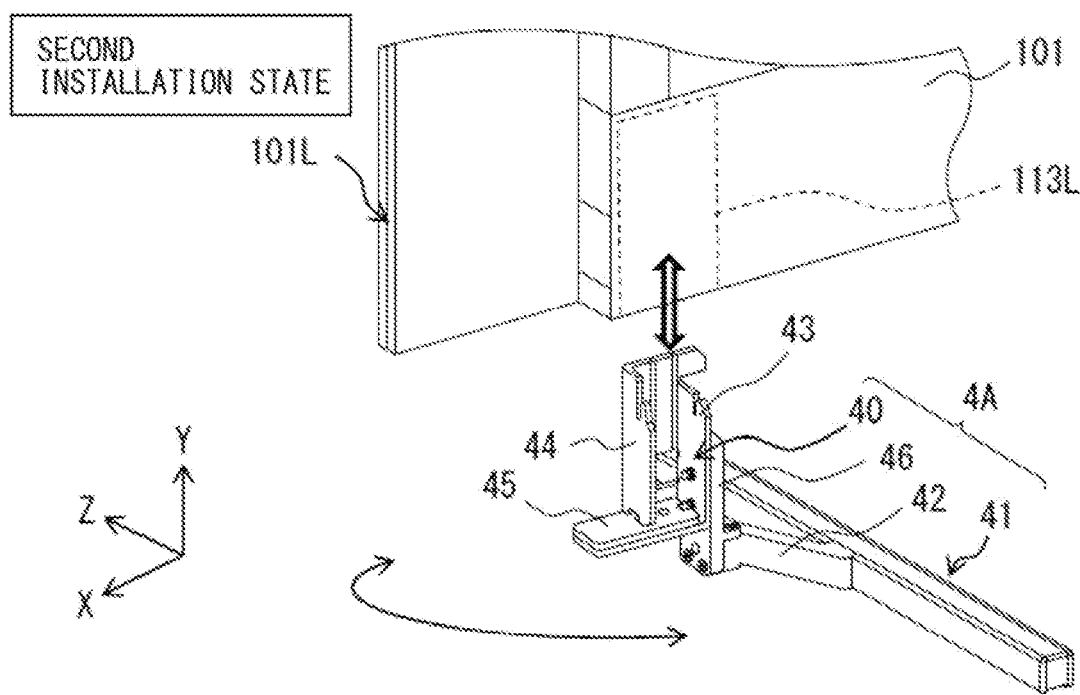
[ FIG. 11B ]
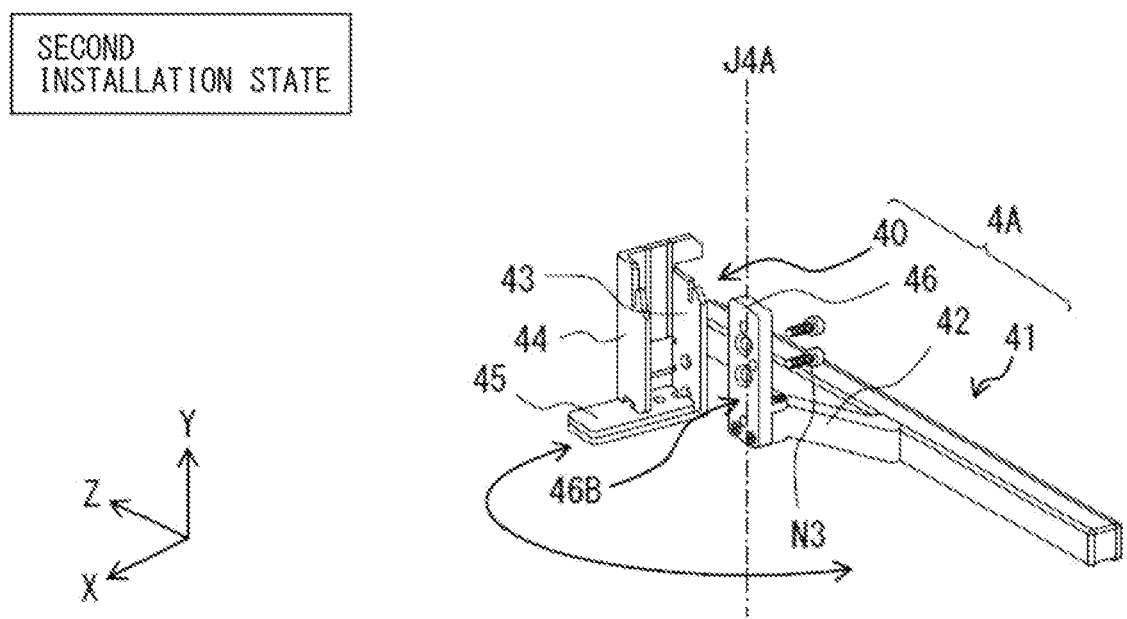

[FIG. 12A]
FOURTH INSTALLATION STATE
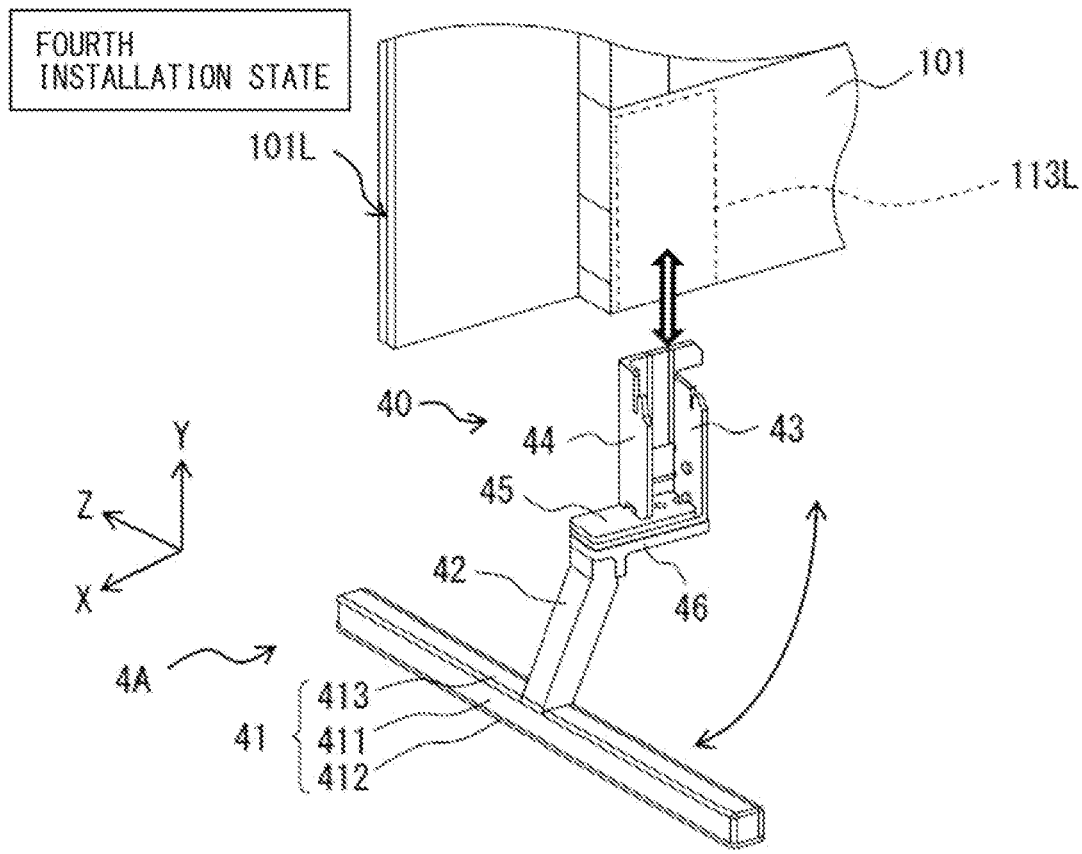
[FIG. 12B]
FOURTH INSTALLATION STATE
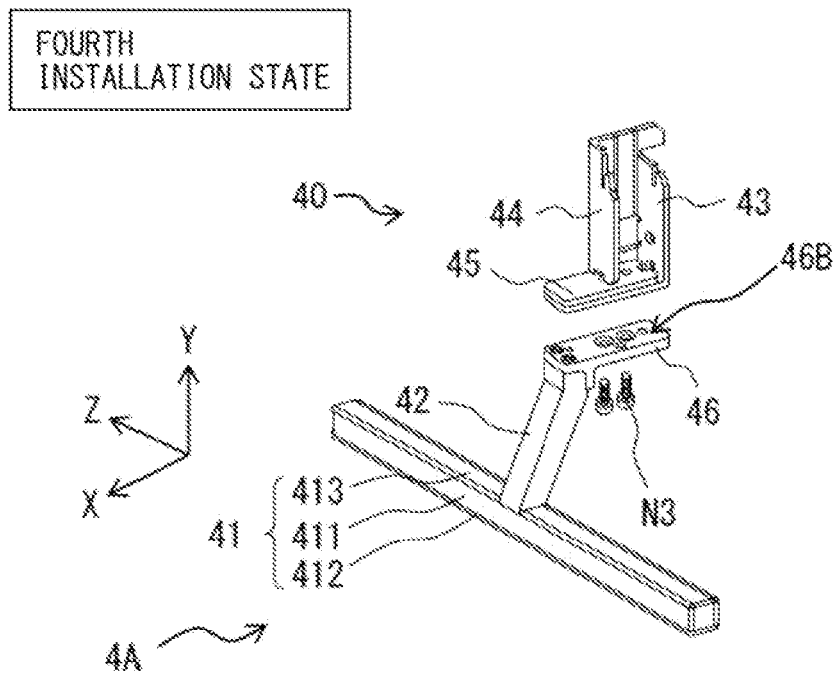

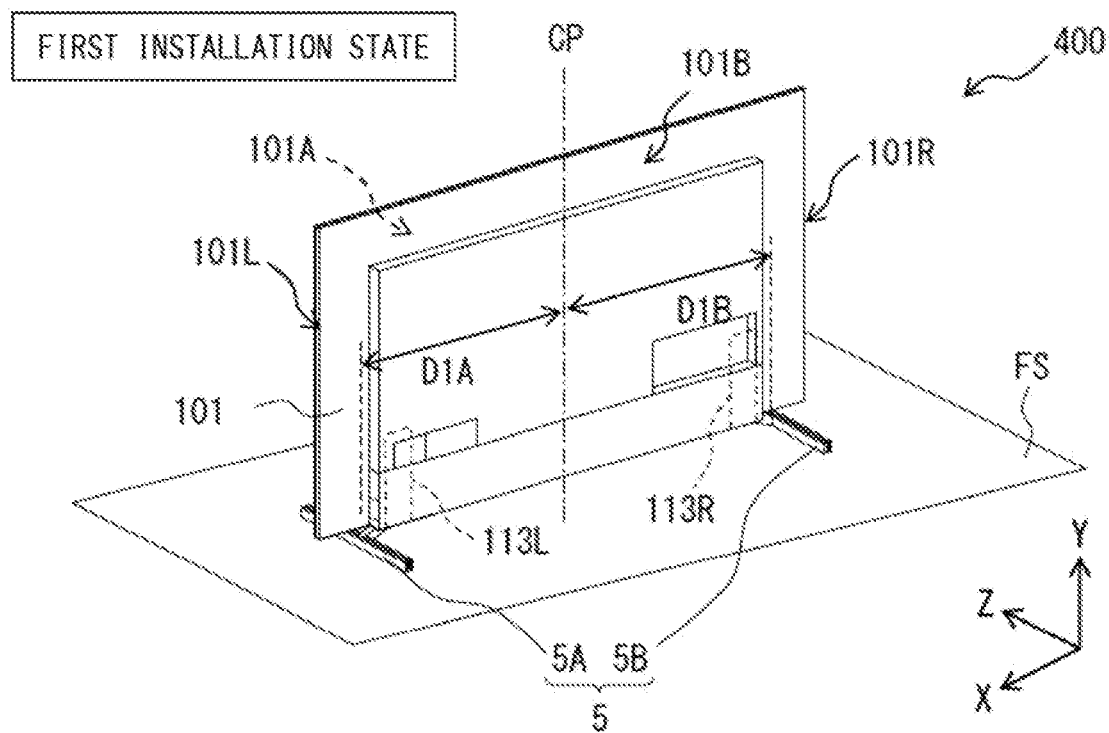
[FIG. 13]

[ FIG. 14A ]
FIRST INSTALLATION STATE
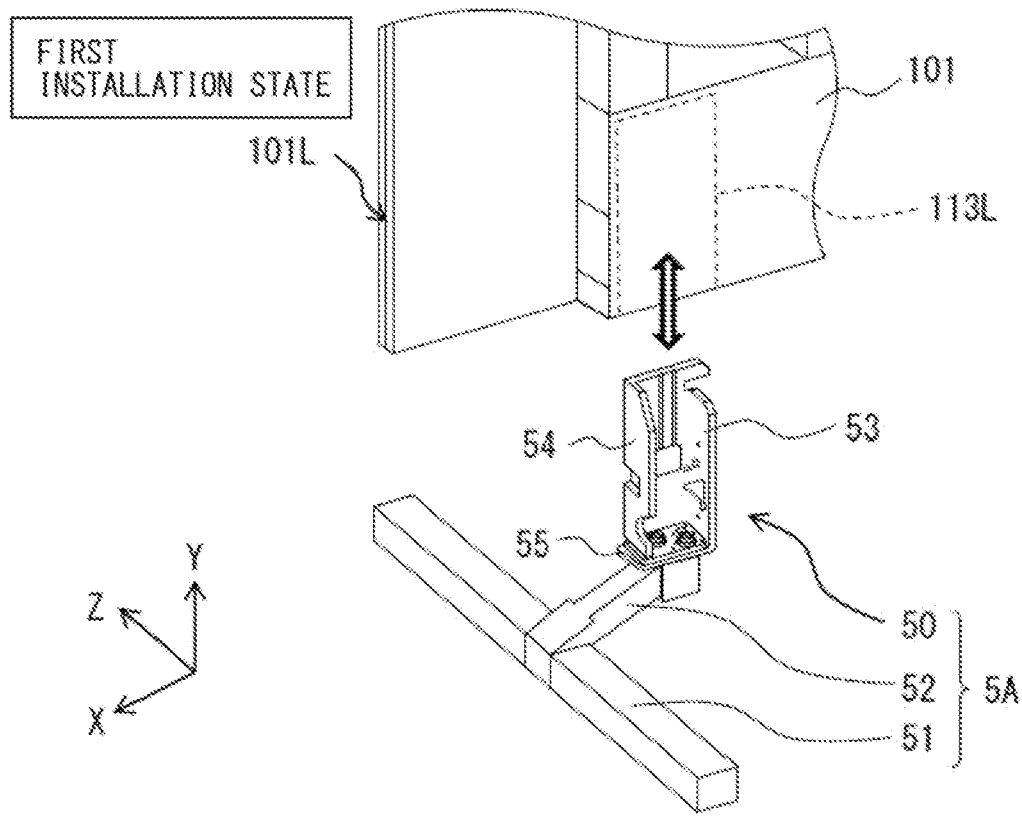
[ FIG. 14B ]
FIRST INSTALLATION STATE
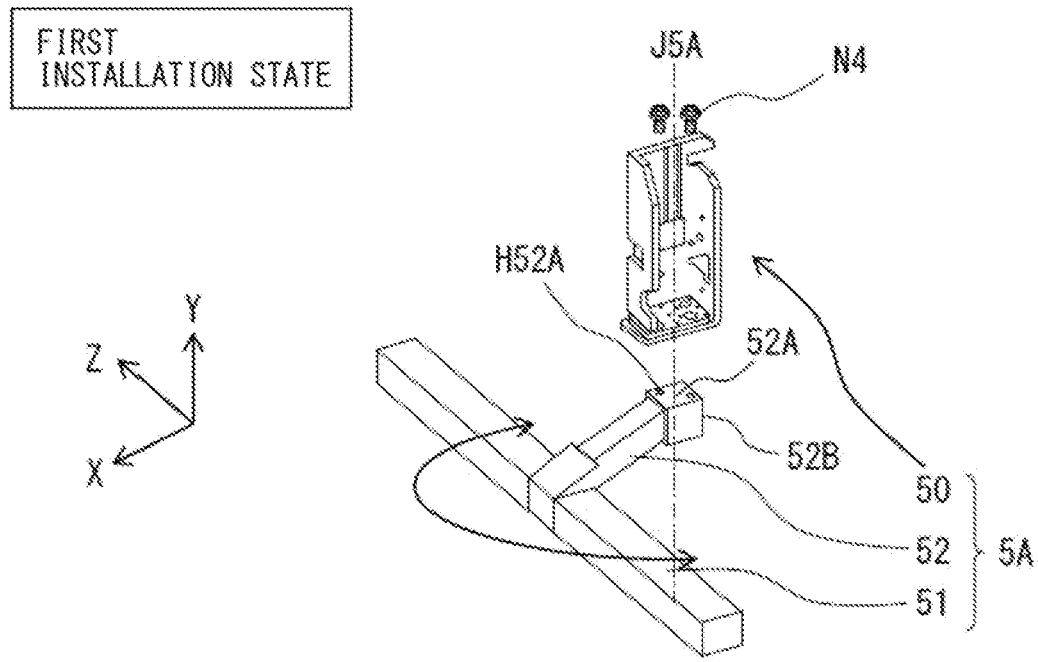

[ FIG. 15A ]
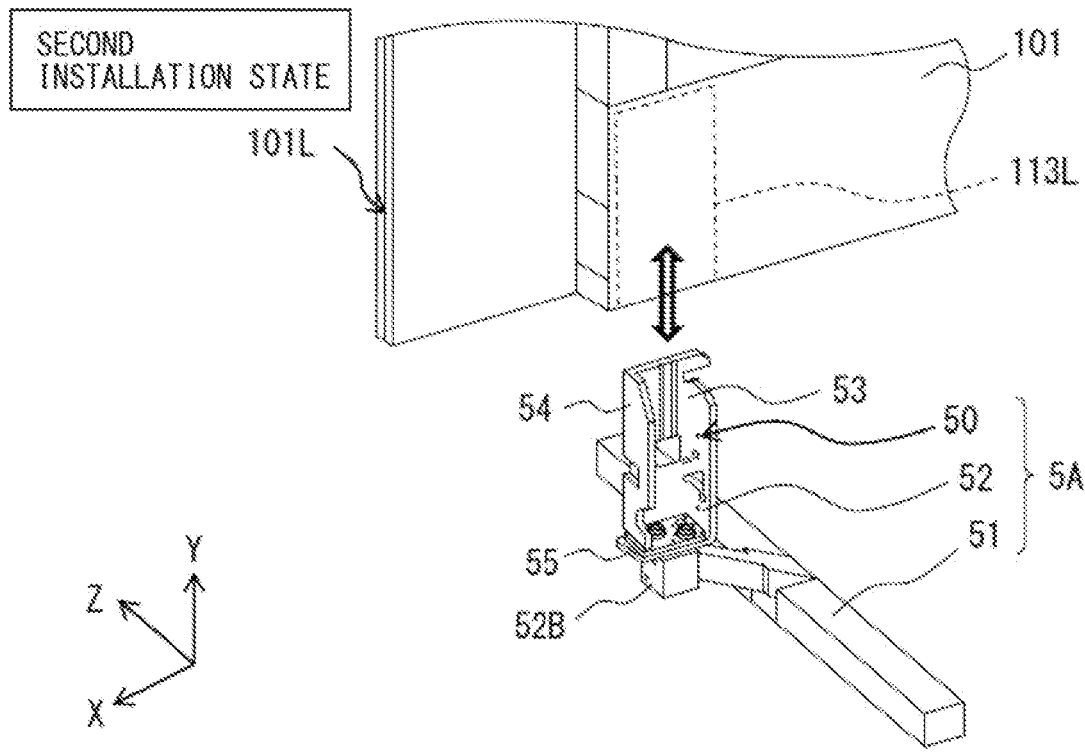
[ FIG. 15B ]
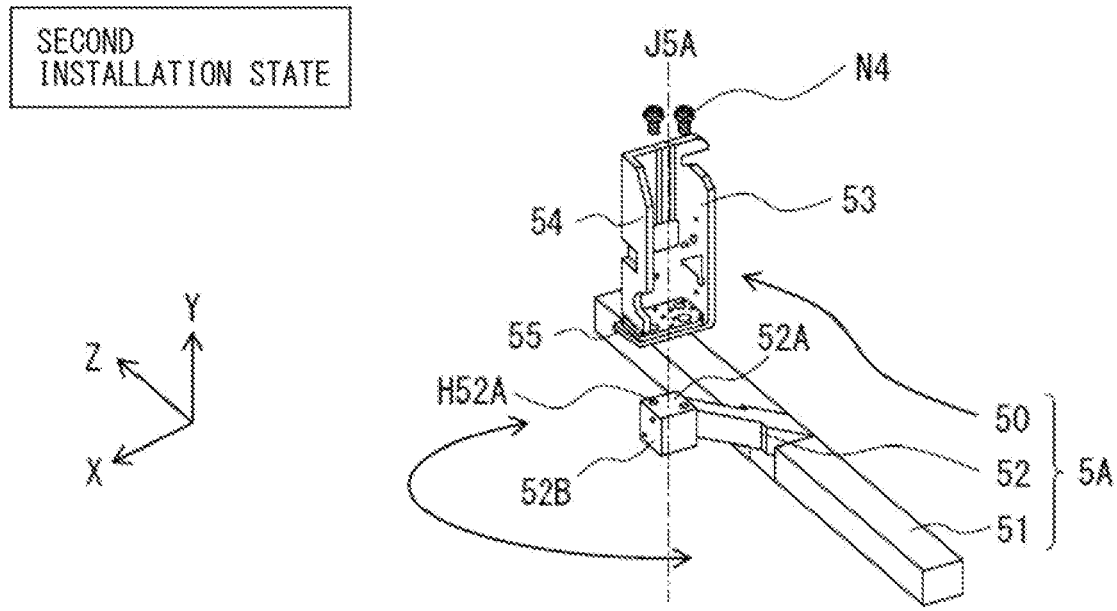

[FIG. 16A]
FOURTH INSTALLATION STATE
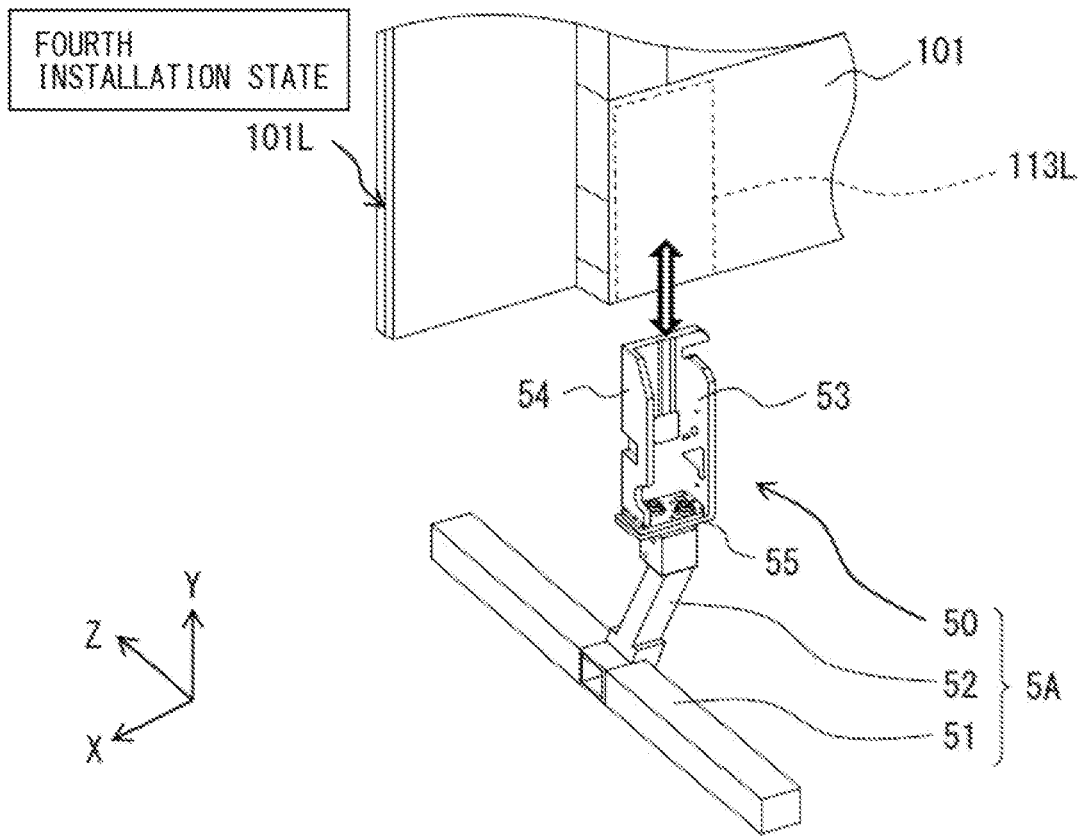
[FIG. 16B]
FOURTH INSTALLATION STATE
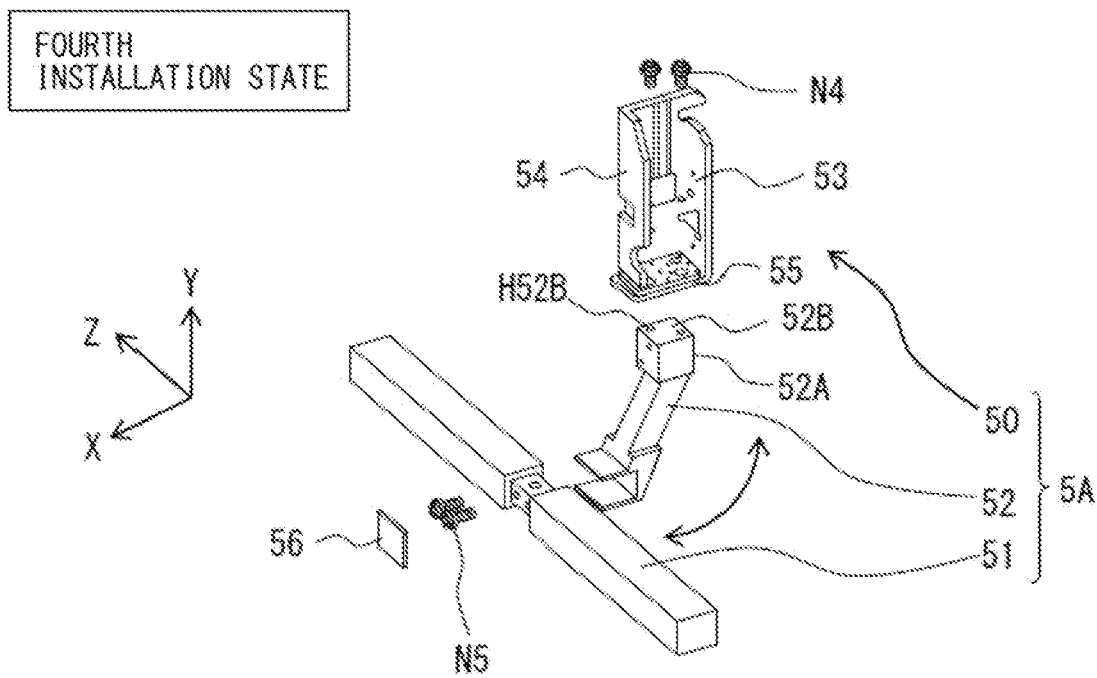

[ FIG. 17A ]
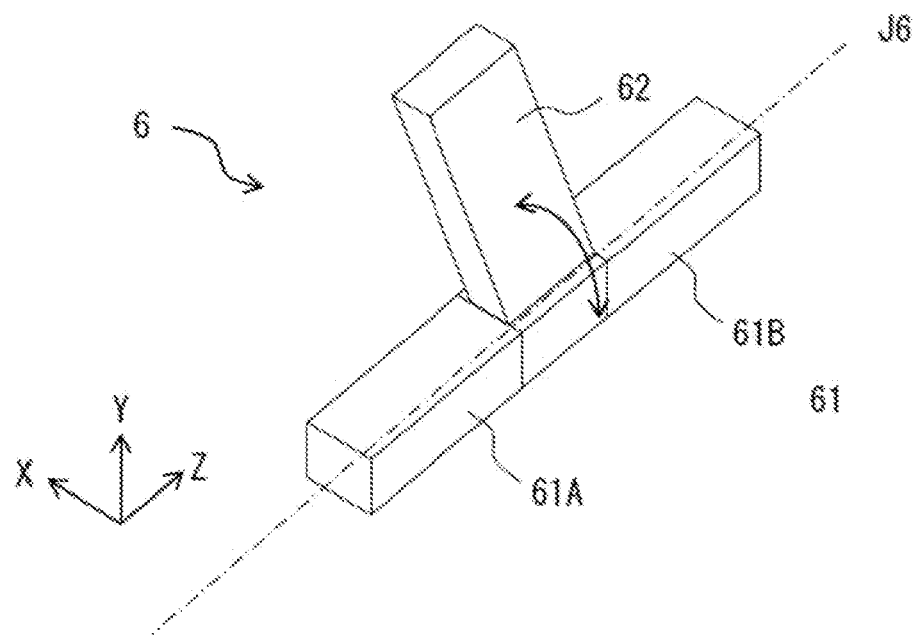
[ FIG. 17B ]
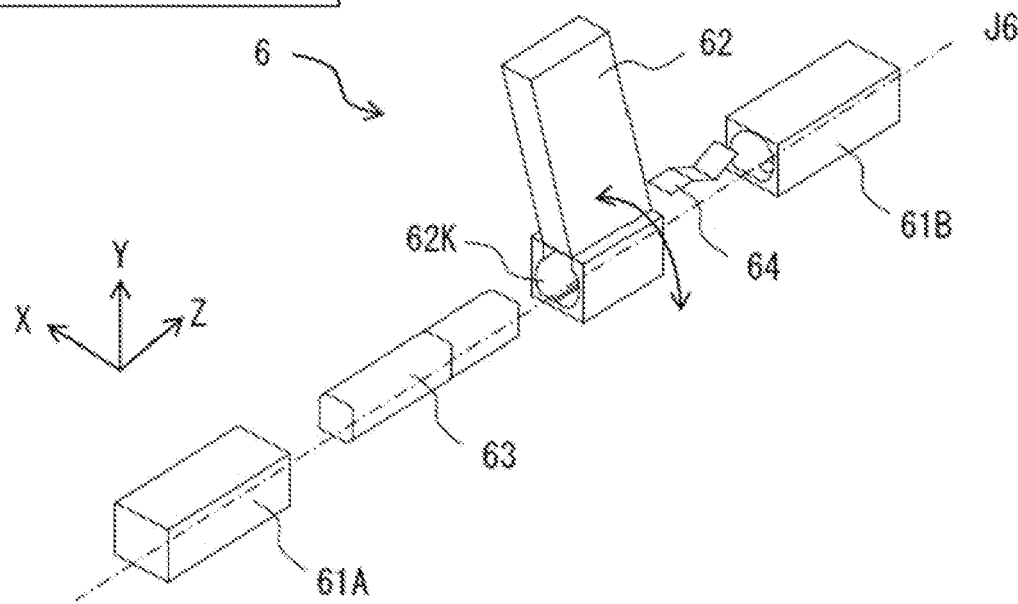

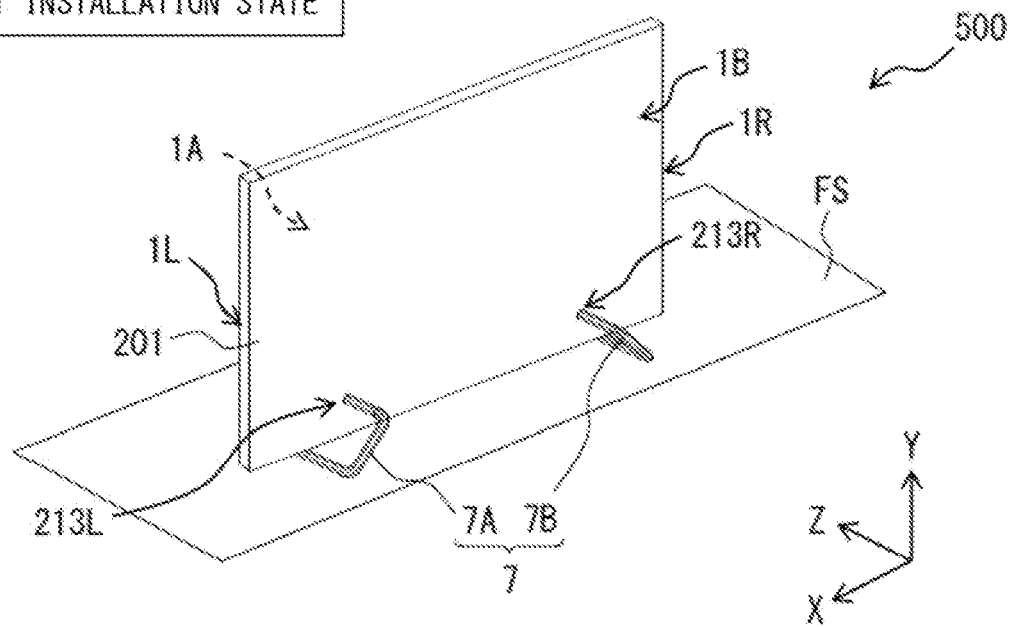
[FIG. 18A] FIRST INSTALLATION STATE
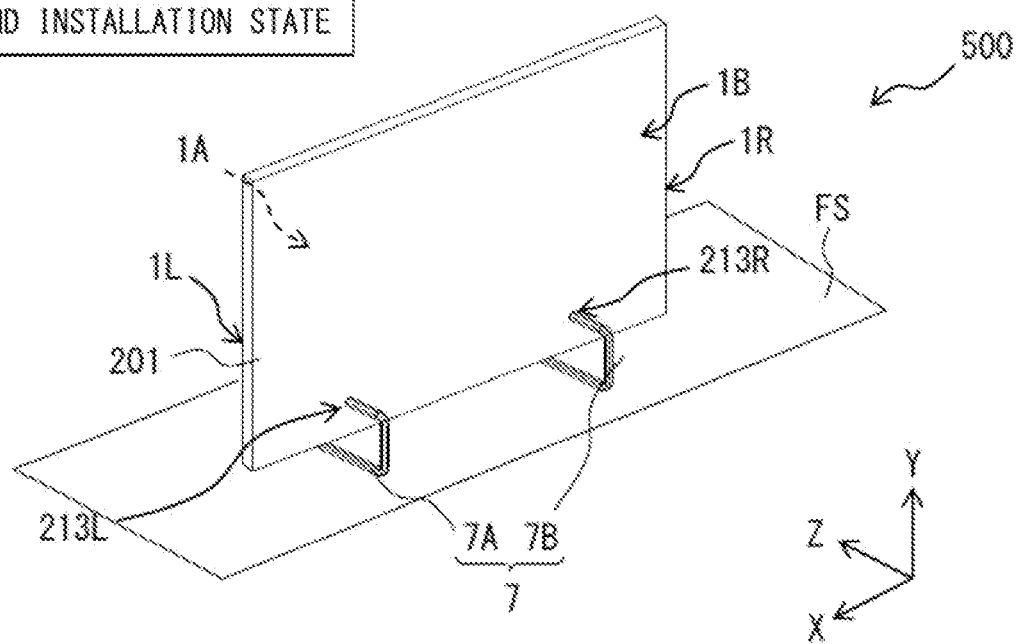
[FIG. 18B] SECOND INSTALLATION STATE

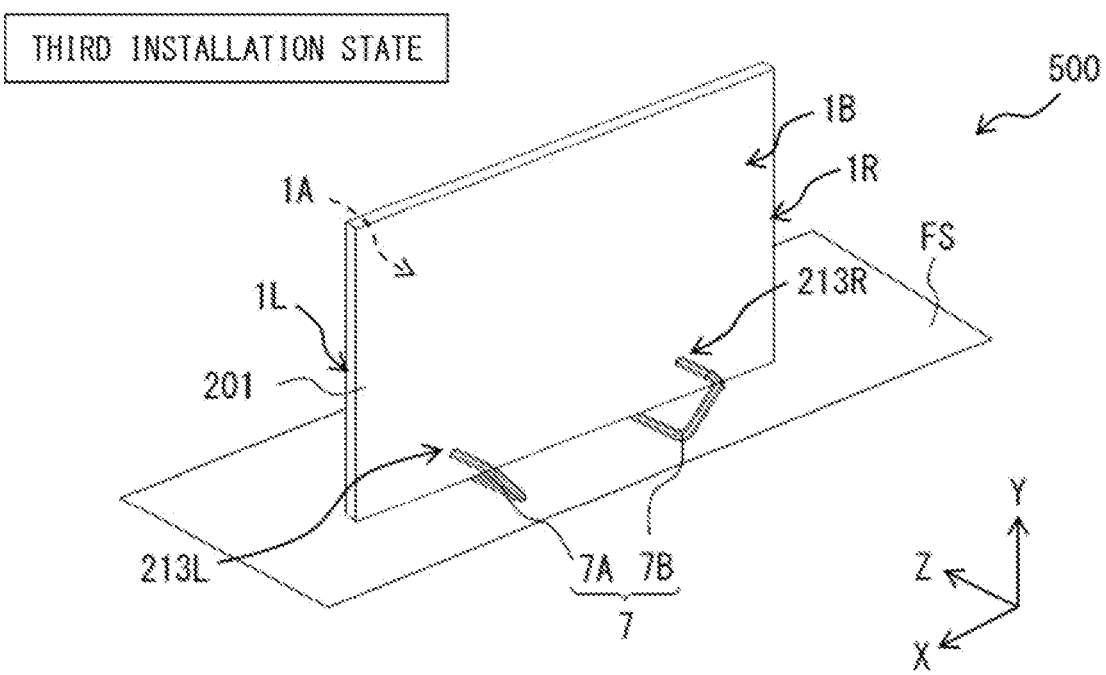
[FIG. 18C] THIRD INSTALLATION STATE

[FIG. 19A]
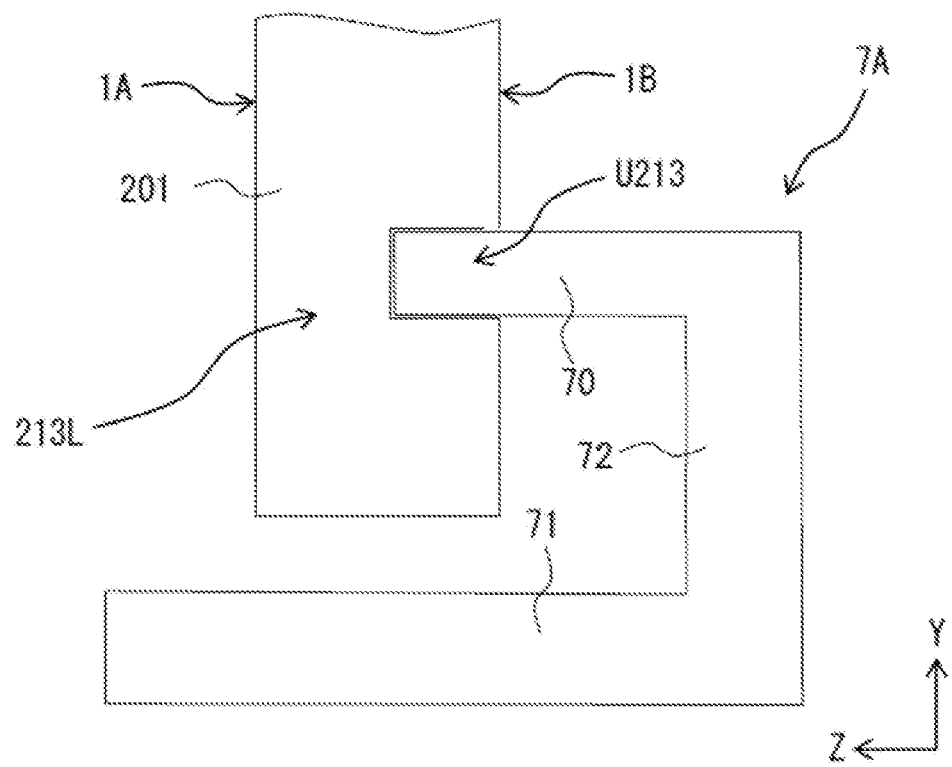
[FIG. 19B]
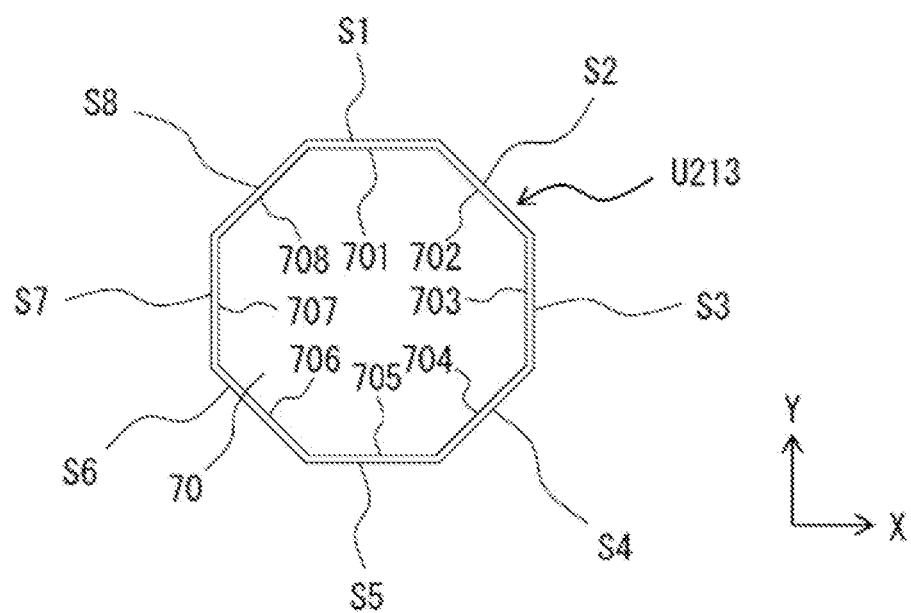

[FIG. 20A]
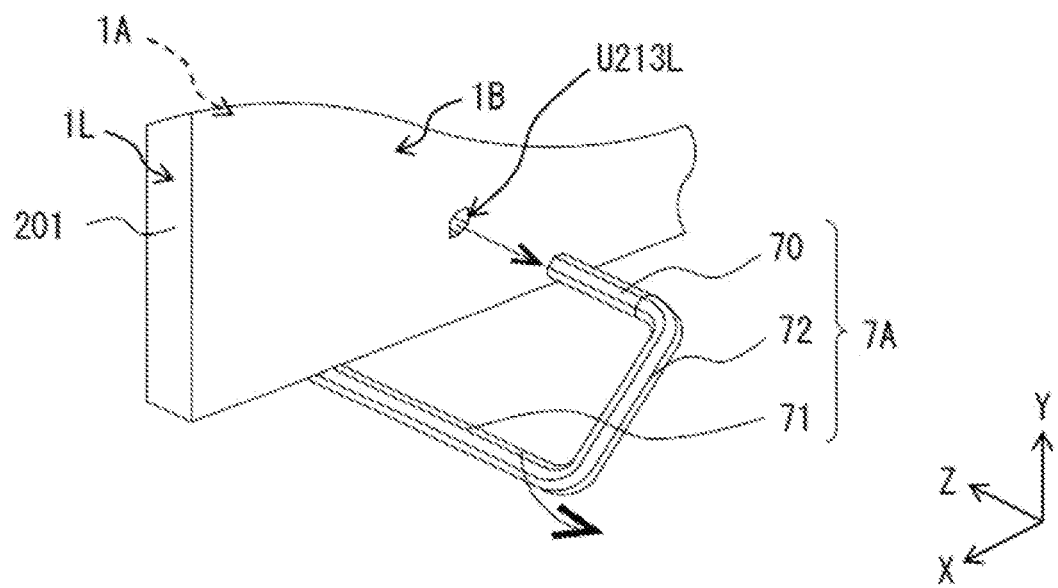
[FIG. 20B]
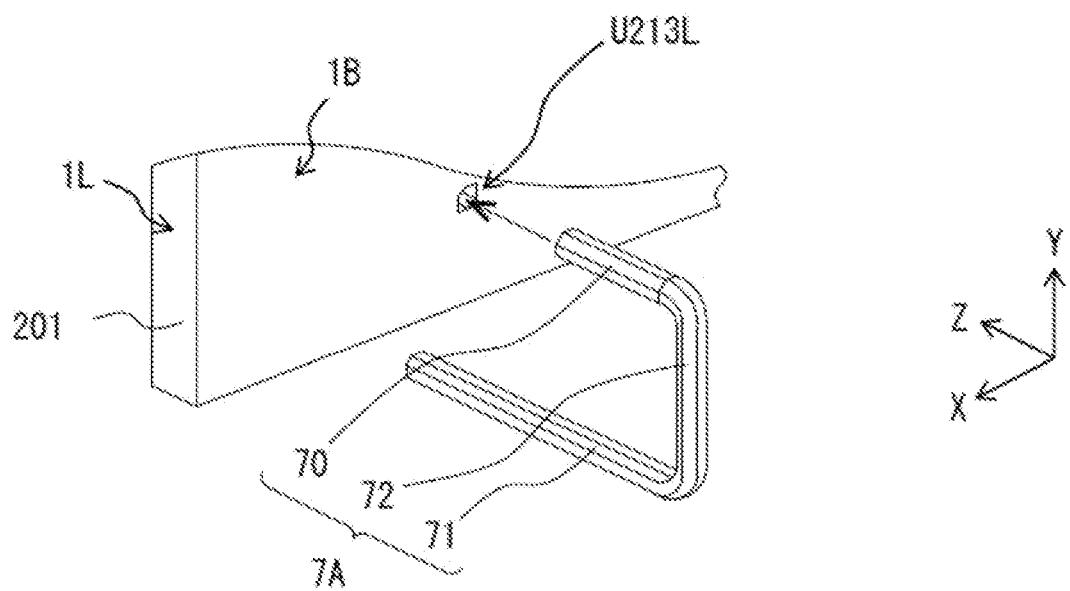

[ FIG. 21A ]
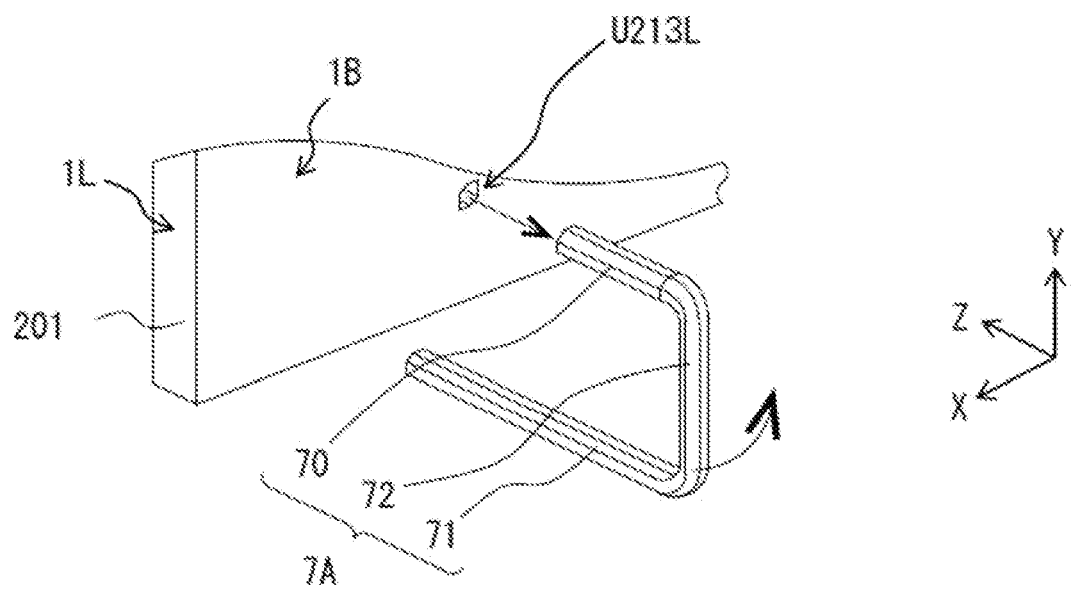
[ FIG. 21B ]
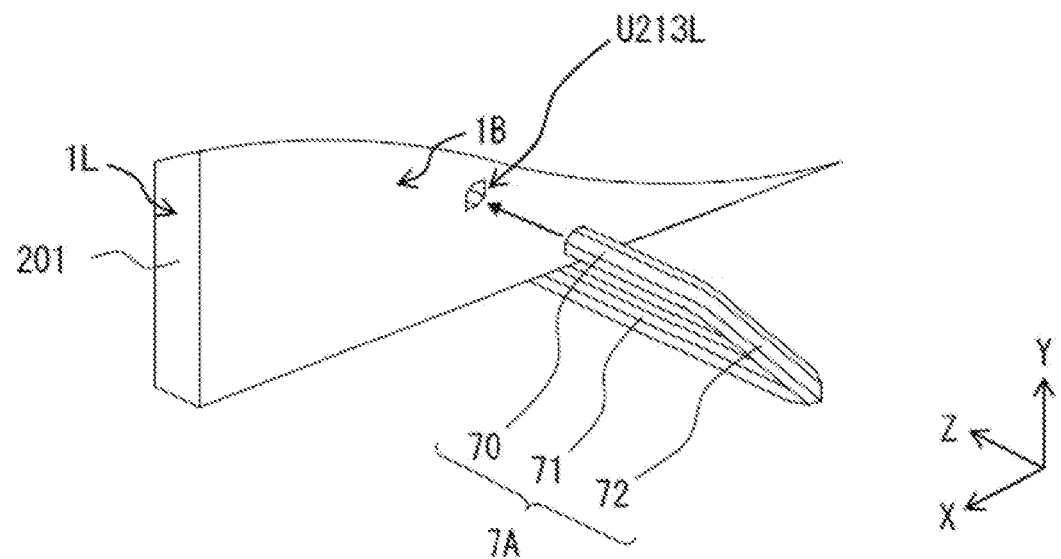

SUPPORTING BODY AND DISPLAY APPARATUS

CROSS-REFERENCE TO RELATED APPLICATIONS

This application is a national phase entry under 35 U.S.C. § 371 of International Application No. PCT/JP2021/036006 filed Sep. 29, 2021, which claims the priority from Japanese Patent Application No. 2020-170685 filed in the Japanese Patent Office on Oct. 8, 2020, the entire contents of which are hereby incorporated by reference.

TECHNICAL FIELD

The present disclosure relates to a supporting body that supports a display unit, and a display apparatus including a display unit and a supporting body.

BACKGROUND ART

In recent years, display apparatuses have been proposed that each include a display panel (a display unit) having a low profile and a large screen size (see PTLs 1 to 3, for example).

CITATION LIST

Patent Literature

PTL 1: Japanese Unexamined Patent Application Publication No. 2004-86046
PTL 2: Japanese Unexamined Patent Application Publication No. 2010-15098
PTL 3: Japanese Unexamined Patent Application Publication No. 2012-141385

SUMMARY OF THE INVENTION

As display units have increased in screen size and decreased in thickness in recent years, aesthetics is desired in supporting bodies that support the display units to cause the display units to stand on a floor surface, for example.

It is therefore desirable to provide a supporting body that is able to select a form of support to a display unit in accordance with a user's purpose or preference, an installation environment, or the like, and a display apparatus including such a supporting body and a display unit.

A supporting body according to an embodiment of the present disclosure supports a display unit including a display section, a first mounting section, and a second mounting section to cause the display unit to stand on a placement surface in a first direction. The display section has a display surface that spreads in each of the first direction and a second direction orthogonal to each other, and the first mounting section and the second mounting section are provided on the display section and disposed side by side in the first direction. The supporting body includes a first supporting unit that is formed detachably on the first mounting section, and a second supporting unit that is formed detachably on the second mounting section. The first supporting unit and the second supporting unit are respectively mountable on the first mounting section and the second mounting section in a first state and a second state in which at least a portion of the first supporting unit and at least a portion of the second supporting unit are rotated in a first plane along the placement surface from the first state.

BRIEF DESCRIPTION OF THE DRAWINGS

FIG. 1A is a perspective view of an entire configuration example in a first installation state of a display apparatus according to a first embodiment of the present disclosure.
FIG. 1B is a perspective view of an entire configuration example in a second installation state of the display apparatus according to the first embodiment of the present disclosure.
FIG. 1C is a perspective view of an entire configuration example in a third installation state of the display apparatus according to the first embodiment of the present disclosure.
FIG. 1D is a perspective view of an entire configuration example in a fourth installation state of the display apparatus according to the first embodiment of the present disclosure.
FIG. 1E is a perspective view of an entire configuration example in a fifth installation state of the display apparatus according to the first embodiment of the present disclosure.
FIG. 1F is a perspective view of an entire configuration example in a sixth installation state of the display apparatus according to the first embodiment of the present disclosure.
FIG. 1G is a perspective view of an entire configuration example in a seventh installation state of the display apparatus according to the first embodiment of the present disclosure.
FIG. 1H is a perspective view of an entire configuration example in an eighth installation state of the display apparatus according to the first embodiment of the present disclosure.
FIG. 2A is a partially enlarged perspective view of an outer mounting section and a first supporting unit of the display apparatus in the first installation state illustrated in FIG. 1A in an enlarged manner.
FIG. 2B is a partially enlarged perspective view of a state in which the first supporting unit is removed from the outer mounting section in the display apparatus in the first installation state illustrated in FIG. 2A.
FIG. 3A is a partially enlarged perspective view of the outer mounting section and the first supporting unit of the display apparatus in the third installation state illustrated in FIG. 1C in an enlarged manner.
FIG. 3B is a partially enlarged perspective view of a state in which the first supporting unit is mounted on the outer mounting section in the display apparatus in the third installation state illustrated in FIG. 3A.
FIG. 4A is a partially enlarged perspective view of the outer mounting section and the first supporting unit of the display apparatus in the second installation state illustrated in FIG. 1B in an enlarged manner.
FIG. 4B is a partially enlarged perspective view of a state in which the first supporting unit is mounted on the outer mounting section in the display apparatus in the second installation state illustrated in FIG. 1B.
FIG. 5A is a perspective view of an entire configuration example in the first installation state of a display apparatus according to a second embodiment of the present disclosure.
FIG. 5B is a perspective view of an entire configuration example in the second installation state of the display apparatus according to the second embodiment of the present disclosure.
FIG. 5C is a perspective view of an entire configuration example in the third installation state of the display apparatus according to the second embodiment of the present disclosure.

FIG. 5D is a perspective view of an entire configuration example in the fourth installation state of the display apparatus according to the second embodiment of the present disclosure.

FIG. 6A is a partially enlarged perspective view of a mounting section and a first supporting unit of the display apparatus in the first installation state illustrated in FIG. 5A in an enlarged manner.

FIG. 6B is an exploded perspective view of the first supporting unit in the display apparatus in the first installation state illustrated in FIG. 6A.

FIG. 7A is a partially enlarged perspective view of the mounting section and the first supporting unit of the display apparatus in the second installation state illustrated in FIG. 5B in an enlarged manner.

FIG. 7B is an exploded perspective view of the first supporting unit in the display apparatus in the second installation state illustrated in FIG. 7A.

FIG. 8A is a partially enlarged perspective view of the mounting section and the first supporting unit of the display apparatus in the fourth installation state illustrated in FIG. 5D in an enlarged manner.

FIG. 8B is an exploded perspective view of the first supporting unit in the display apparatus in the fourth installation state illustrated in FIG. 8A.

FIG. 9A is a perspective view of an entire configuration example in the first installation state of a display apparatus according to a third embodiment of the present disclosure.

FIG. 9B is a perspective view of an entire configuration example in the second installation state of the display apparatus according to the third embodiment of the present disclosure.

FIG. 9C is a perspective view of an entire configuration example in the third installation state of the display apparatus according to the third embodiment of the present disclosure.

FIG. 9D is a perspective view of an entire configuration example in the fourth installation state of the display apparatus according to the third embodiment of the present disclosure.

FIG. 10A is a partially enlarged perspective view of a mounting section and a first supporting unit of the display apparatus in the first installation state illustrated in FIG. 9A in an enlarged manner.

FIG. 10B is an exploded perspective view of the first supporting unit illustrated in FIG. 10A.

FIG. 11A is a partially enlarged perspective view of the mounting section and the first supporting unit of the display apparatus in the second installation state illustrated in FIG. 9B in an enlarged manner.

FIG. 11B is an exploded perspective view of the first supporting unit illustrated in FIG. 11A.

FIG. 12A is a partially enlarged perspective view of the mounting section and the first supporting unit of the display apparatus in the fourth installation state illustrated in FIG. 9D in an enlarged manner.

FIG. 12B is an exploded perspective view of the first supporting unit illustrated in FIG. 12A.

FIG. 13 is a perspective view of an entire configuration example in the first installation state of a display apparatus according to a fourth embodiment of the present disclosure.

FIG. 14A is a partially enlarged perspective view of a first supporting unit in the fourth installation state of the display apparatus illustrated in FIG. 13 in an enlarged manner.

FIG. 14B is an exploded perspective view of the first supporting unit illustrated in FIG. 14A.

FIG. 15A is a partially enlarged perspective view of the first supporting unit in the second installation state of the display apparatus illustrated in FIG. 13 in an enlarged manner.

FIG. 15B is an exploded perspective view of the first supporting unit illustrated in FIG. 15A.

FIG. 16A is a partially enlarged perspective view of the first supporting unit in the fourth installation state of the display apparatus illustrated in FIG. 13 in an enlarged manner.

FIG. 16B is an exploded perspective view of the first supporting unit illustrated in FIG. 16A.

FIG. 17A is a perspective view of a supporting unit as a modification example in an enlarged manner.

FIG. 17B is an exploded perspective view of the supporting unit illustrated in FIG. 17A.

FIG. 18A is a perspective view of an entire configuration example in the first installation state of a display apparatus according to a fifth embodiment of the present disclosure.

FIG. 18B is a perspective view of an entire configuration example in the second installation state of the display apparatus according to the fifth embodiment of the present disclosure.

FIG. 18C is a perspective view of an entire configuration example in the third installation state of the display apparatus according to the fifth embodiment of the present disclosure.

FIG. 19A is a schematic enlarged view of a state of a vicinity of a mounting section in the display apparatus illustrated in FIG. 18A as viewed from side.

FIG. 19B is a schematic enlarged view of a state of the vicinity of the mounting section in the display apparatus illustrated in FIG. 18A as viewed from behind.

FIG. 20A is a first explanatory diagram that describes a procedure for changing from the first installation state illustrated in FIG. 18A to the second installation state illustrated in FIG. 18B.

FIG. 20B is a second explanatory diagram that describes the procedure for changing from the first installation state illustrated in FIG. 18A to the second installation state illustrated in FIG. 18B.

FIG. 21A is a first explanatory diagram that describes a procedure for changing from the second installation state illustrated in FIG. 18B to the third installation state illustrated in FIG. 18C.

FIG. 21B is a second explanatory diagram that describes the procedure for changing from the second installation state illustrated in FIG. 18B to the third installation state illustrated in FIG. 18C.

MODES FOR CARRYING OUT THE INVENTION

In a supporting body and a display apparatus including the supporting body of the present disclosure, at least first to fourth installation states are configured to be selectable. In the following, some embodiments of the present disclosure are described in detail with reference to the drawings. It is to be noted that description is given in the following order.

1. First Embodiment
   An example of a display apparatus including a stand that includes a pair of supporting units that support a display unit in eight installation states and each are integrated (Type 1)

2. Second Embodiment
An example of a display apparatus including a stand that supports a display unit in four installation states (Type 2)
3. Third Embodiment
An example of a display apparatus including a stand that supports a display unit in four installation states (Type 3)
4. Fourth Embodiment
An example of a display apparatus including a stand that supports a display unit in four installation states (Type 4)
5. Fifth Embodiment
An example of a display apparatus including a stand mountable on a display unit in a plurality of attitudes (Type 6)
6. Other Modification Examples 1. First Embodiment

[Configuration of Display Apparatus 100]

FIGS. 1A to 1H respectively illustrate entire configuration examples in first to eighth installation states of a display apparatus 100 according to a first embodiment of the present disclosure. FIGS. 1A to 1H are respectively perspective views of states of the display apparatus 100 in the first to eighth installation states as viewed from behind.

As illustrated in FIGS. 1A to 1H, the display apparatus 100 is a so-called stationary type display apparatus including a display unit 1 and a stand 2 as a supporting body that supports the display unit 1 on a placement surface FS. It is to be noted that the placement surface FS is a horizontal surface such as a floor surface, a shelf surface, or a top surface of a board.

(Display Unit 1)

The display unit 1 includes, for example, a display panel having a display surface 1A that displays an image toward front side. The display surface 1A is a horizontally long rectangular screen extending in each of a horizontal direction and a vertical direction, and has a first edge 1L and a second edge 1R that are positioned opposite to each other in the horizontal direction with a center position CP interposed therebetween. It is to be noted that in this description, the horizontal direction is referred to as an X-axis direction, the vertical direction is referred to as a Y-axis direction, and a front-back direction intersecting with the display surface 1A is referred to as a Z-axis direction. Examples of the display panel include a liquid crystal display device including a liquid crystal layer, an organic EL display device including an organic EL element, and the like.

The display unit 1 includes, for example, a circuit board provided with a drive circuit that drives the display panel, an image processing circuit, and the like, in addition to the display panel. The display unit 1 has a back surface 1B opposite to the display surface 1A, and a lower portion of the back surface 1B is provided with mounting sections at two points each on left and right sides, for a total of four points. Specifically, the display unit 1 includes outer mounting sections 13L and 13R provided near respective ends in the horizontal direction of the display panel, and inner mounting sections 14L and 14R respectively provided between the outer mounting section 13L and the center position CP and between the outer mounting section 13R and the center position CP. Each of the outer mounting sections 13L and 13R and the inner mounting sections 14L and 14R is, for example, a portion recessed from another portion of the back surface 1B of the display unit 1, and has screw holes, into which screws are screwed, at three or more points, for example.

(Stand 2)

As illustrated in FIGS. 1A to 1H, the stand 2 includes a first supporting unit 2A and a second supporting unit 2B. The first supporting unit 2A and the second supporting unit 2B are provided as different bodies. The first supporting unit 2A is detachably provided on at least both the outer mounting section 13L and the inner mounting section 14L. The second supporting unit 2B is detachably provided on at least both the outer mounting section 13R and the inner mounting section 14R.

In the first to fourth installation states (FIGS. 1A to 1D), the first supporting unit 2A is mounted on the outer mounting section 13L between the center position CP and the first edge 1L in the X-axis direction of the display unit 1. In the fifth to eighth installation states (FIGS. 1E to 1H), the first supporting unit 2A is mounted on the inner mounting section 14L between the center position CP and the outer mounting section 13L in the X-axis direction of the display unit 1.

In the first to fourth installation states (FIGS. 1A to 1D), the second supporting unit 2B is mounted on the outer mounting section 13R between the center position CP and the second edge 1R in the X-axis direction of the display unit 1. In the fifth to eighth installation states (FIGS. 1E to 1H), the second supporting unit 2B is mounted on the inner mounting section 14R between the center position CP and the outer mounting section 13R in the X-axis direction of the display unit 1.

The second supporting unit 2B is able to have substantially the same configuration as the first supporting unit 2A, except for having a configuration bilaterally symmetrical to that of the first supporting unit 2A. For this reason, the first supporting unit 2A is basically described below, and description of the second supporting unit 2B is omitted as appropriate.

FIG. 2A is a partially enlarged perspective view of the outer mounting section 13L and the first supporting unit 2A of the display apparatus 100 in the first installation state illustrated in FIG. 1A in an enlarged manner. FIG. 2B is a partially enlarged perspective view of a state in which the first supporting unit 2A is removed from the outer mounting section 13L in the display apparatus in the first installation state illustrated in FIG. 2A.

As illustrated in FIGS. 2A and 2B, the first supporting unit 2A includes a neck 20A as a first attaching section attachable on the outer mounting section 13L, a base 21A to be in contact with the placement surface FS, and an arm 22A that joins the neck 20A and the base 21A together. It is to be noted that a portion configured by the base 21A and the arm 22A corresponds to a specific example of a "first grounding section" of the present disclosure. Here, for example, the neck 20A, the base 21A, and the arm 22A are integrally formed. It is possible to manufacture the first supporting unit 2A, for example, by casting. However, the first supporting unit 2A may be a unit formed by individually molding a plurality of members and then joining the members by welding or the like. Furthermore, at least one of the neck 20A, the base 21A, or the arm 22A may be configured to be separable from another portion.

The neck 20A has, for example, two screw holes H20A1 and H20A2 disposed side by side in the vertical direction. Meanwhile, the outer mounting section 13L has three screw holes H13L1 to H13L3 disposed side by side in the vertical direction. Here, an interval between the screw hole H20A1 and the screw hole H20A2 in the neck 20A is substantially equal to both an interval between the screw hole H13L1 and the screw hole H13L2 and an interval between the screw hole H13L2 and the screw hole H13L3 in the outer mounting section 13L.

As illustrated in FIGS. 2A and 2B, in the first installation state, the screw holes H20A1 and H20A2 in the neck 20A are respectively aligned to the screw holes H13L1 and H13L2 in the outer mounting section 13L, and each are fastened by a screw N1. In the first installation state, the arm 22A extends from a portion coupled to the neck 20A to outside of the positions of the screw holes H13L1 to H13L3 in the outer mounting section 13L in the horizontal direction (X-axis direction) to be joined to the base 21A. Accordingly, as illustrated in FIG. 1A and the like, the base 21A is located at a position farther from the center position CP than the neck 20A in the horizontal direction (X-axis direction). This state is referred to as an "outward position" for the sake of convenience. In the first installation state that is the outward position, a distance D1A (FIG. 1A) between the base 21A and the center position CP is longer than, for example, a distance D2A (FIG. 1B) between the base 21A and the center position CP in the second installation state to be described later.

FIG. 3A is a partially enlarged perspective view of the outer mounting section 13L and the first supporting unit 2A of the display apparatus 100 in the third installation state illustrated in FIG. 1C in an enlarged manner. FIG. 3B is a partially enlarged perspective view of a state in which the first supporting unit 2A is mounted on the outer mounting section 13L in the display apparatus 100 in the third installation state illustrated in FIG. 3A.

As illustrated in FIGS. 3A and 3B, in the third installation state, the screw holes H20A and H20A2 in the neck 20A are respectively aligned to the screw holes H13L2 and H13L3 in the outer mounting section 13L, and each are fastened by the screw N1. In other words, the third installation state is a state in which the first supporting unit 2A including the neck 20A moves vertically downward from the first installation state. Accordingly, in the third installation state, the display unit 1 is located at a higher position with respect to the placement surface FS as a reference as compared with the first installation state. This state is referred to as a "high position" for the sake of convenience. Meanwhile, in the first installation state, the display unit is located at a lower position with respect to the placement surface FS as the reference, as compared with the third installation state. This is referred to as a "low position" for the sake of convenience. In addition, even in the third installation state, the base 21A is located at a position farther from the center position CP than the neck 20A in the horizontal direction (X-axis direction); therefore, the base 21A is also at the otherward position. It is to be noted that a distance D3A (FIG. 1C) between the base 21A and the center position CP in the third installation state is substantially equal to the distance D1A (FIG. 1A) between the base 21A and the center position CP in the first installation state.

Thus, in the display apparatus 100, the first installation state is an "outward low position", and the third installation state is an "outward high position". In the display apparatus 100, switching between the first installation state and the third installation state is achieved by shifting a relative position between the display unit 1 and each of the first supporting unit 2A and the second supporting unit 2B in the Y-axis direction.

FIG. 4A is a partially enlarged perspective view of the outer mounting section 13L and the first supporting unit 2A of the display apparatus 100 in the second installation state illustrated in FIG. 1B in an enlarged manner. FIG. 4B is a partially enlarged perspective view of a state in which the first supporting unit 2A is mounted on the outer mounting section 13L in the display apparatus 100 in the second installation state illustrated in FIG. 4A.

As illustrated in FIGS. 4A and the 4B, in the second installation state, the first supporting unit 2A is mounted on the outer mounting section 13L in an attitude rotated by, for example, 180° from a first grounding state (see FIGS. 1A and 2A) in an XZ plane along the placement surface FS. In this case, the screw holes H20A1 and H20A2 in the neck 20A are respectively aligned to the screw holes H13L1 and H13L2 in the outer mounting section 13L, and each are fastened by the screw N1. Accordingly, a position in a height direction (Y-axis direction) of the display unit 1 in the second installation state is the same as that in the first installation state, that is, the low position. However, in the second installation state, the arm 22A extends from the portion coupled to the neck 20A to inside the positions of the screw holes H13L1 to H13L3 in the outer mounting section 13L in the horizontal direction (X-axis direction) to be joined to the base 21A. Accordingly, as illustrated in FIG. 1B and the like, the base 21A is located at a position closer to the center position CP than the neck 20A in the horizontal direction (X-axis direction). This state is referred to as an "inward position" for the sake of convenience. In the first installation state that is the inward position, the distance D1B (FIG. 1B) between the base 21A and the center position CP is shorter than, for example, the distance D2A (FIG. 1A) in the first installation state and the distance D3A (FIG. 1A) in the third installation state.

Thus, in the display apparatus 100, the second installation state is an "inward low position". In the display apparatus 100, rotating each of the first supporting unit 2A and the second supporting unit 2B of the stand 2 by 180° in a horizontal plane (XZ plane) with respect to the display unit 1 makes it possible to perform switching between the first installation state and the second installation state.

Likewise, in the fourth installation state illustrated in FIG. 1D, the first supporting unit 2A and the second supporting unit 2B are mounted on the outer mounting sections 13L and 13R in an attitude in which the first supporting unit 2A and the second supporting unit 2B are rotated by, for example, 180° from a third grounding state (see FIG. 1C) in the XZ plane along the placement surface FS. Accordingly, the position in the height direction (Y-axis direction) of the display unit 1 in the fourth installation state is equal to that in the third installation state, that is, the high position. However, in the fourth installation state, the first supporting unit 2A and the second supporting unit 2B are mounted on the outer mounting sections 13L and 13R in an inward attitude; therefore, the fourth installation state is the inward position.

Thus, the fourth installation state is an "inward high position". In the display apparatus 100, rotating each of the first supporting unit 2A and the second supporting unit 2B of the stand 2 by 180° in the horizontal plane (XZ plane) with respect to the display unit 1 makes it possible to perform switching between the third installation state and the fourth installation state. In addition, in the display apparatus 100, switching between the second installation state and the fourth installation state is achieved by shifting the relative position between the display unit 1 and each of the first supporting unit 2A and the second supporting unit 2B in the Y-axis direction.

In addition, description of the first to fourth installation states illustrated in FIGS. 1A to 1D applies to the fifth to eighth installation states illustrated in FIGS. 1E to 1H, except that the stand 2, that is, the first supporting unit 2A and the second supporting unit 2B are respectively mounted on the inner mounting sections 14L and 14R instead of being mounted on the outer mounting sections 13L and 13R.

[Workings and Effects of Display Apparatus 100]

As described above, according to the display apparatus 100 according to the present embodiment, the display unit 1 is stably supported by the stand 2 as the supporting body. In addition, in the display apparatus 100, the first to eighth installation states are configured to be selectable by rearrangement of the first supporting unit 2A and the second supporting unit 2B with respect to the display unit 1, which makes it possible to realize eight viewing positions. This makes it possible to select a form of support to the display unit 1 in accordance with a user's purpose or preference, an installation environment, or the like.

Specifically, it is possible to select the first to fourth installation states, specifically the first and third installation states in an environment in which it is possible to secure the placement surface FS having a sufficient width. In this case, an interval between the base 21A of the first supporting unit 2A and the base 21B of the second supporting unit 2B is widened, which makes it possible to secure sufficient supporting stability, for example, even in a case where the bases 21A and 21B are provided to stand on the placement surface FS. In contrast, in an environment in which it is not possible to secure the placement surface FS having a sufficient width, it is possible to select the fourth to eighth installation states, specifically the sixth and eighth installation states.

In addition, for example, in a case where an audio device such as a sound bar or any other device is installed on the placement surface FS, it is possible to select the high position, that is, the third, fourth, seventh, and the eighth installation states. Selecting the high position makes it possible to prevent the display surface 1A of the display unit 1 from being blocked by any other device such as a sound bar. Specifically, in the third and fourth installation state, any other device such as a sound bar is fit between the first supporting unit 2A and the second supporting unit 2B to obtain high aesthetics. In addition, it is possible to bring the display surface 1A close to the other device in the Z-axis direction, which is advantageous in space saving. In contrast, in a case where another such device is not installed, the low-position state such as the first, second, fifth, and the sixth installation states may be selected. In this case, it is possible to bring the display unit 1 close to the placement surface FS, which makes it possible to enhance aesthetics.

In addition, in the display apparatus 100, the first supporting unit 2A and the second supporting unit 2B that are made common in the first to eighth installation states are each used. Accordingly, the number of components is reduced as compared with a case where different stands are used for the first to eighth installation states, or the like, which is advantageous in cost reduction, and complicated work for a user, such as storage is not necessary and there is no possibility of losing components.

In addition, in the display apparatus 100, each of the first supporting unit 2A and the second supporting unit 2B is integrated, thereby making it possible to reduce the number of components, which is advantageous in cost reduction. In addition, rearrangement work of the first to eighth installation states by a user is easy.

In addition, in the display apparatus 100, in the first installation state and the third installation state, the neck 20 is mounted on each of the outer mounting sections 13L and 13R to cause at least a portion of the base 21 to protrude outside the display surface 1A. Accordingly, in the first installation state and the third installation state, it is possible to prevent the base 21 from being reflected on the display surface 1A, resulting in an improvement in image view ability.

In addition, in the display apparatus 100, a grounding surface of the base 21 in contact with the placement surface FS is the same in all the first to eighth installation states, resulting in an improvement in flexibility in design of the first supporting unit 2A and the second supporting unit 2B including the base 21.

2. Second Embodiment

[Configuration of Display Apparatus 200]

FIGS. 5A to 5D respectively illustrate entire configuration examples in first to fourth installation states of a display apparatus 200 according to a second embodiment of the present disclosure. FIGS. 5A to 5D are respectively perspective views of states of the display apparatus 200 in the first to fourth installation states as viewed from behind. The display apparatus 200 includes a display unit 101 and a stand 3 that supports the display unit 101.

The display unit 101 includes, for example, a display panel having a display surface 101A that displays an image toward front side. The display surface 101A is a horizontally long rectangular screen extending in each of the horizontal direction and the vertical direction, and has a first edge 101L and a second edge 101R that are positioned opposite to each other in the horizontal direction with the center position CP interposed therebetween.

The display unit 101 includes, for example, a circuit board provided with a drive circuit that drives the display panel, an image processing circuit, and the like, in addition to the display panel. The display unit 101 has a back surface 101B opposite to the display surface 101A, and a lower portion of the back surface 101B of the display panel is provided with one mounting section 113L and one mounting section 113R respectively on the left and the right. Each of the mounting sections 113L and 113R is, for example, a recessed portion that has an exposed opening at a lower end of the display unit 101, and extends in the Y-axis direction.

(Stand 3)

As illustrated in FIGS. 5A to 5D, the stand 3 includes a first supporting unit 3A and a second supporting unit 3B. The first supporting unit 3A and the second supporting unit 3B are provided as different bodies. The first supporting unit 3A is detachably provided on at least the mounting section 113L. The second supporting unit 2B is detachably provided on at least the mounting section 113R.

In the display apparatus 200, the first installation state in FIG. 5A is the "outward low position", and the second installation state in FIG. 5B is the "inward low position". In the display apparatus 200, rotating each of a portion of the first supporting unit 3A and a portion of the second supporting unit 3B of the stand 3 by 180° in the horizontal plane (in the XZ plane) with respect to the display unit 101 makes it possible to implement switching between the first installation state (FIG. 5A) and the second installation state (FIG. 5B).

In the display apparatus 200, the third installation state in FIG. 5C is the "inward high position", and the fourth installation state in FIG. 5D is the "outward high position". In the display apparatus 200, rotating each of a portion of the first supporting unit 3A and a portion of the second supporting unit 3B of the stand 3 by 180° in the horizontal plane (in the XZ plane) with respect to the display unit 101 makes it possible to implement switching between the third installation state (FIG. 5C) and the fourth installation state (FIG. 5D).

In addition, in the display apparatus 200, rotating each of the first supporting unit 3A and the second supporting unit 3B of the stand 3 by 90° in a vertical plane (in an XY plane) along the display surface 101A with respect to the display unit 101 makes it possible to implement switching between the first installation state (FIG. 5A) and the third installation state (FIG. 5C). Likewise, rotating each of the first supporting unit 3A and the second supporting unit 3B of the stand 3 by 90° in the vertical plane (in the XY plane) along the display surface 101A with respect to the display unit 101 makes it possible to implement switching between the second installation state (FIG. 5B) and the fourth installation state (FIG. 5D).

The second supporting unit 3B is able to have substantially the same configuration as the first supporting unit 3A, except for having a configuration bilaterally symmetrical to that of the first supporting unit 3A. For this reason, the first supporting unit 3A is basically described below, and description of the second supporting unit 3B is omitted as appropriate.

FIG. 6A is a partially enlarged perspective view of the mounting section 113L and the first supporting unit 3A of the display apparatus 200 in the first installation state illustrated in FIG. 5A in an enlarged manner. It is to be noted that FIG. 6A illustrates a state in which the first supporting unit 3A is drawn downward, that is, in a —Y direction from the mounting section 113L. FIG. 6B is an exploded perspective view of the first supporting unit 3A in the display apparatus 200 in the first installation state illustrated in FIG. 6A.

As illustrated in FIGS. 6A and 6B, the first supporting unit 3A includes a neck 30 as a first attaching section attachable on the mounting section 113L, a base 31 to be in contact with the placement surface FS, and an arm 32 that joins the neck 30 and the base 31 together. It is to be noted that a portion configured by the base 31 and the arm 32 corresponds to a specific example of a "first grounding section" of the present disclosure. Here, the base 31 and the arm 32 are integrally formed. Note that in the first supporting unit 3A, the base 31 and the arm 32 may be configured to be separatable. As illustrated in FIG. 6A, the base 31 includes a main body 311 that is formed with use of, for example, a highly rigid material such as stainless steel, and a pair of elastic members 312 and 313 that are formed with the main body 311 interposed therebetween. It is to be noted that in any of the first to fourth installation states, the main body 311 is not in contact with the placement surface FS, and only the elastic member 312 or both the elastic member 312 and the elastic member 313 are in contact with the placement surface FS.

In the first supporting unit 3A, the neck 30, the base 31, and the arm 32 are formed to be separable. The neck 30 is mountable on each of the mounting sections 113L and 113R always in the same attitude. It is to be noted that the neck 30 is inserted into each of the mounting sections 113L and 113R, which allows each of the first supporting unit 3A and the second supporting unit 3B to be held by the display unit 101 with enough strength not to be dropped by its weight. In addition, strongly pulling each of the first supporting unit 3A and the second supporting unit 3B makes it possible to individually remove the first supporting unit 3A and the second supporting unit 3B from the display unit 3. The neck 30 includes a bottom plate section 35 and a pair of side plate sections 33 and 34 that are provided to stand on the bottom plate section 35 and are separated from and opposed to each other in the X-axis direction. The arm 32 includes a first joining surface 21A to be joined to the bottom plate section 35 in the first installation state (FIG. 5A) and the second installation state (FIG. 5B), and a second joining surface 32B to be joined to the bottom plate section 35 in the third installation state and fourth installation state (see FIG. 6B). Joining between the bottom plate section 35 and the first joining surface 32A and joining between the bottom plate section 35 and the second joining surface 32B are performed, for example, by fastening by a screw N2.

FIG. 7A is a partially enlarged perspective view of the mounting section 113L and the first supporting unit 3A of the display apparatus 200 in the second installation state illustrated in FIG. 5B in an enlarged manner. It is to be noted that FIG. 7A illustrates a state in which the first supporting unit 3A is drawn downward, that is, in the —Y direction from the mounting section 113L. FIG. 7B is an exploded perspective view of the first supporting unit 3A in the second installation state illustrated in FIG. 7A.

To perform state change between the first installation state (FIGS. 6A and 6B) and the second installation state (FIGS. 7A and 7B), first, as illustrated in FIG. 6B or FIG. 7B, the screw N2 is temporarily removed to separate the bottom plate section 35 and the first joining surface 32A from each other. Thereafter, the base 31 and the arm 32 are rotated by 180° about a rotation axis J3A in the Y-axis direction in the horizontal plane (in the XZ plane), and thereafter, the bottom plate section 35 and the joining surface 32A are joined together again. In this case, the screw N2 is inserted into the bottom plate section 35, and is screwed into a screw hole H32A of the first joining surface 32A.

FIG. 8A is a partially enlarged perspective view of the mounting section 113L and the first supporting unit 3A of the display apparatus 200 in the fourth installation state illustrated in FIG. 5D in an enlarged manner. It is to be noted that FIG. 8A illustrates a state in which the first supporting unit 3A is drawn downward, that is, in the —Y direction from the mounting section 113L. FIG. 8B is an exploded perspective view of the first supporting unit 3A in the fourth installation state illustrated in FIG. 8A. As illustrated in FIGS. 8A and 8B, in the fourth installation state that is the high position, a main surface of the elastic member 312 in the base 31 abuts on the placement surface FS, which further improves supporting stability. The same applies to the third installation state (FIG. 5C).

To perform state change between the second installation state (FIGS. 7A and 7B) and the fourth installation state (FIGS. 8A and 8B), first, as illustrated in FIG. 7B or FIG. 8B, the screw N2 is temporarily removed to separate the bottom plate section 35 and the first joining surface 32A from each other, or to separate the bottom plate section 35 and the second joining surface 32B from each other. Thereafter, the base 31 and the arm 32 are rotated by 90° in the vertical plane (in the XY plane), and thereafter, the bottom plate section 35 and the second joining surface 32B. or the bottom plate section 35 and the first joining surface 32A are joined together. In this case, the screw N2 is inserted into the bottom plate section 35 and is screwed into the screw hole H32A of the joining surface 32A or a screw hole H32B of the second joining surface 32B. It is to be noted that switching between the first installation state (FIG. 5A) and the third installation state (FIG. 5C) may be performed in a similar manner. That is, it is sufficient if the bottom plate section 35 and the first joining surface 32A or the second joining surface 32B are separated from each other, the base 31 and the arm 32 are rotated by 90° in the vertical plane (in the XY plane), and thereafter, the bottom plate section 35 and the second joining surface 32B or the first joining surface 32A are joined together.

[Workings and Effects of Display Apparatus 200]

As described above, according to the display apparatus 200 according to the present embodiment, the display unit 101 is stably supported by the stand 3 as the supporting body. In addition, in the display apparatus 200, the first to fourth installation states are configured to be selectable by rearrangement of the first supporting unit 3A and the second supporting unit 3B with respect to the display unit 101, which makes it possible to realize four viewing positions. This makes it possible to select a form of support to the display unit 1 in accordance with a user's purpose or preference, an installation environment, or the like.

3. Third Embodiment

[Configuration of Display Apparatus 300]

FIGS. 9A to 9D respectively illustrate entire configuration examples in first to fourth installation states of a display apparatus 300 according to a third embodiment of the present disclosure. FIGS. 9A to 9D are respectively perspective views of states of the display apparatus 300 in the first to fourth installation states as viewed from behind. The display apparatus 300 includes the display unit 101 and a stand 4 that supports the display unit 101.

The display unit 101 is as described in the second embodiment described above. Therefore, the stand 4 used for the display apparatus 300 according to the present embodiment is described below.

(Stand 4)

As illustrated in FIGS. 9A to 9D, the stand 4 includes a first supporting unit 4A and a second supporting unit 4B. The first supporting unit 4A and the second supporting unit 4B are provided as different bodies. The first supporting unit 4A is detachably provided on at least the mounting section 113L. The second supporting unit 4B is detachably provided on at least the mounting section 113R.

In the display apparatus 300, the first installation state in FIG. 9A is the "outward low position", and the second installation state in FIG. 9B is the "inward low position". In the display apparatus 300, rotating each of a portion of the first supporting unit 4A and a portion of the second supporting unit 4B of the stand 4 by 180° in the horizontal plane (in the XZ plane) with respect to the display unit 101 makes it possible to implement switching between the first installation state (FIG. 9A) and the second installation state (FIG. 9B).

In the display apparatus 300, the third installation state in FIG. 9C is the "inward high position", and the fourth installation state in FIG. 9D is the "outward high position". In the display apparatus 300, rotating each of a portion of the first supporting unit 4A and a portion of the second supporting unit 4B of the stand 4 by 180° in the horizontal plane (in the XZ plane) with respect to the display unit 101 makes it possible to implement switching between the third installation state (FIG. 9C) and the fourth installation state (FIG. 9D).

In addition, in the display apparatus 300, rotating each of a portion of the first supporting unit 4A and a portion of the second supporting unit 4B of the stand 4 by 90° in the vertical plane (in the XY plane) along the display surface 101A with respect to the display unit 101 makes it possible to implement switching between the first installation state (FIG. 9A) and the third installation state (FIG. 9C). Likewise, rotating each of a portion of the first supporting unit 4A and a portion of the second supporting unit 4B of the stand 4 by 90° in the vertical plane (in the XY plane) along the display surface 101A with respect to the display unit 101 makes it possible to implement switching between the second installation state (FIG. 9B) and the fourth installation state (FIG. 9D).

The second supporting unit 4B is able to have substantially the same configuration as the first supporting unit 4A, except for having a configuration bilaterally symmetrical to that of the first supporting unit 4A. For this reason, the first supporting unit 4A is basically described below, and description of the second supporting unit 4B is omitted as appropriate.

FIG. 10A is a partially enlarged perspective view of the mounting section 113L and the first supporting unit 4A of the display apparatus 300 in the first installation state illustrated in FIG. 9A in an enlarged manner. FIG. 10B is an exploded perspective view of the first supporting unit 4A illustrated in FIG. 10A. In addition, FIG. 11A is a partially enlarged perspective view of the mounting section 113L and the first supporting unit 4A of the display apparatus 300 in the second installation state illustrated in FIG. 9B in an enlarged manner. FIG. 11B is an exploded perspective view of the first supporting unit 4A illustrated in FIG. 11A. It is to be noted that FIGS. 10A and 11A each illustrate a state in which the first supporting unit 4A is drawn downward, that is, in the —Y direction from the mounting section 113L.

As illustrated in FIGS. 10A and 10B and FIGS. 11A and 11B, the first supporting unit 4A includes a neck 40 as a first attaching section attachable on the mounting section 113L, a base 41 to be in contact with the placement surface FS, an arm 42 that is coupled to the base 31, and a stay 46 that joins the arm 42 and the neck 40 together. It is to be noted that a portion configured by the base 41, the arm 42, and the stay 46 corresponds to a specific example of a "first grounding section" of the present disclosure. Here, all of the base 41, the arm 42, and the stay 46, and the neck 40 may be provided to be separable. Note that, in the first supporting unit 4A, the base 41, the arm 42, and the stay 46 may be configured to be separatable from each other. As illustrated in FIG. 10A, the base 41 includes a main body 411 that is formed with use of, for example, a highly rigid material such as stainless steel, and a pair of elastic members 412 and 413 that are formed with the main body 311 interposed therebetween. It is to be noted that in any of the first to fourth installation states, the main body 411 is not in contact with the placement surface FS, and only the elastic member 412 or both the elastic member 412 and the elastic member 413 are in contact with the placement surface FS.

The neck 40 is mountable on each of the mounting sections 113L and 113R always in the same attitude. It is to be noted that the neck 40 is inserted into each of the mounting sections 113L and 113R, which allows each of the first supporting unit 4A and the second supporting unit 4B to be held by the display unit 101 with enough strength not to be dropped by its weight. In addition, strongly pulling each of the first supporting unit 4A and the second supporting unit 4B makes it possible to individually remove the first supporting unit 4A and the second supporting unit 4B from the display unit 101. The neck 40 includes a bottom plate section 45 and a pair of side plate sections 43 and 44 that are provided to stand on the bottom plate section 45 and are separated from and opposed to each other in the X-axis direction.

The stay 46 is joined to the side plate section 43 in the first grounding state (FIG. 9A) and the second installation state (FIG. 9B). The stay 46 includes, for example, a first joining surface 46A to be joined to the side plate section 43 in the first installation state (FIG. 9A), and a second joining surface 36B to be joined to the side plate section 43 in the second installation state (FIG. 9B). It is to be noted that the second joining surface 46B of the stay 46 is joined to the bottom plate section 45 in the third installation state (FIG. 9C) and the fourth installation state (FIG. 9D) that both are the high position. Joining between the side plate section 43 and the stay 46 and joining between the bottom plate section 45 and the stay 46 are implemented, for example, by fastening by a screw N3.

To perform state change between the first installation state (FIGS. 10A and 10B) and the second installation state (FIGS. 11A and 11B), first, as illustrated in FIG. or FIG. 11B, the screw N3 is temporarily removed to separate the side plate section 43 and the stay 46 from each other. Thereafter, the base 41, the arm 42, and the stay 46 are rotated by 180° about a rotation axis J4A in the Y-axis direction in the horizontal plane (in the XZ plane), and thereafter, the side plate section 43 and the stay 46 are joined together again. In this case, the screw N3 is screwed into a screw hole provided in each of the side plate sections 43 and the stay 46.

FIG. 12A is a partially enlarged perspective view of the mounting section 113L and the first supporting unit 4A of the display apparatus 300 in the fourth installation state illustrated in FIG. 9D in an enlarged manner. It is to be noted that FIG. 12A illustrates a state in which the first supporting unit 4A is drawn downward, that is, in the −Y direction from the mounting section 113L. FIG. 12B is an exploded perspective view of the first supporting unit 4A in the display apparatus 300 in the fourth installation state illustrated in FIG. 12A. As illustrated in FIGS. 12A and 12B, in the fourth installation state that is the high position, a main surface of the elastic member 412 in the base 41 abuts on the placement surface FS, which further improves supporting stability. The same applies to the third installation state (FIG. 9C).

To perform state change between the second installation state (FIGS. 11A and 11B) and the fourth installation state (FIGS. 12A and 12B), first, as illustrated in FIG. 11B or FIG. 12B, the screw N3 is temporality removed to separate the side plate section 43 and the stay 46 from each other. Thereafter, the base 41, the arm 42, and the stay 46 are rotated by 90° on the vertical plane (in the XY plane), and thereafter, the bottom plate section 45 and the stay 46 are joined together. In this case, the screw N3 is screwed into a screw hole provided in each of the bottom plate section 45 and the stay 46. It is to be noted that switching between the first installation state (FIG. 9A) and the third installation state (FIG. 9C) may be performed in a similar manner. That is, it is sufficient if the side plate section 43 and the stay 46 are separated from each other, and the base 41, the arm 42, and the stay 46 are rotated by 90° in the vertical plane (in the XY plane), and thereafter, the bottom plate section 45 and the stay 46 are joined together.

[Workings and Effects of Display Apparatus 300]

As described above, according to the display apparatus 300 according to the present embodiment, the display unit 101 is stably supported by the stand 4 as the supporting body. In addition, in the display apparatus 300, the first to fourth installation states are configured to be selectable by rearrangement of the first supporting unit 4A and the second supporting unit 4B with respect to the display unit 101, which makes it possible to realize four viewing positions. This makes it possible to select a form of support to the display unit 1 in accordance with a user's purpose or preference, an installation environment, or the like.

3. Fourth Embodiment

[Configuration of Display Apparatus 400]

FIG. 13 illustrates an entire configuration example in the first installation state of a display apparatus 300 according to a fourth embodiment of the present disclosure. FIG. 13 is a perspective view of a state of the display apparatus 400 in the first installation state as viewed from behind. The display apparatus 400 includes the display unit 101 and a stand 5 that supports the display unit 101.

The display unit 101 is as described in the second embodiment described above. Therefore, the stand 5 used for the display apparatus 400 according to the present embodiment is described below.

(Stand 4)

As illustrated in FIG. 13, the stand 5 includes a first supporting unit 5A and a second supporting unit 5B. The first supporting unit 5A and the second supporting unit are provided as different bodies. The first supporting unit 5A is detachably provided on at least the mounting section 113L. The second supporting unit 5B is detachably provided on at least the mounting section 113R.

In the display apparatus 400, the first installation state in FIG. 13 is the "outward low position". For example, as with the display apparatus 200 according to the second embodiment illustrated in FIGS. 9A to 9D, in the display apparatus 400, in addition to the first installation state, the "inward low position" as the second installation state, the "inward high position" as the third installation state, and the "outward high position" as the fourth installation state are configured to be selectable.

The second supporting unit 5B is able to have substantially the same configuration as the first supporting unit 2A, except for having a configuration bilaterally symmetrical to that of the first supporting unit 5A. For this reason, the first supporting unit 5A is basically described below, and description of the second supporting unit 5B is omitted as appropriate.

FIG. 14A is an enlarged perspective view of an appearance in the first installation state of the first supporting unit 5A included in the stand 5 according to the fourth embodiment of the present disclosure. FIG. 14B is an exploded perspective view of the first supporting unit 5A illustrated in FIG. 14A.

(Stand 4)

As illustrated in each of FIGS. 14 and 14B, the first supporting unit 5A includes a neck 50 as a first attaching section attachable on the mounting section 113L of the display unit 101, a base 51 to be in contact with the placement surface FS, and an arm that joins the neck 50 and the base 51 together. It is to be noted that a portion configured by the base 51 and the arm 52 corresponds to a specific example of a "first grounding section" of the present disclosure. Here, the base 51 and the arm 52 may be configured to be separable. An elastic member is provided on a bottom surface, that is, a surface opposed to the placement surface FS of the base 51.

FIG. 15A is a partially enlarged perspective view of the mounting section 113L and the first supporting unit 5A of the display apparatus 400 in the second installation state in an enlarged manner. It is to be noted that FIG. 15A illustrates a state in which the first supporting unit 5A is drawn downward, that is, in the —Y direction from the mounting section 113L. IG. 15B is an exploded perspective view of the first supporting unit 5A in the second installation state illustrated in FIG. 15A.

FIG. 16A is a partially enlarged perspective view of the mounting section 113L and the first supporting unit 5A of the display apparatus 400 in the fourth installation state in an enlarged manner. It is to be noted that FIG. 16A illustrates a state in which the first supporting unit 5A is drawn downward, that is, in the —Y direction from the mounting section 113L. FIG. 16B is an exploded perspective view of the first supporting unit 5A in the fourth installation state illustrated in FIG. 16A.

In the first supporting unit 5A, the neck 50, the base 51, and the arm 52 are formed to be separable from each other, and are joined, for example, by fastening by a screw. The neck 50 is mountable on each of the mounting sections 113L and 113R always in the same attitude. It is to be noted that the neck 50 is inserted into each of the mounting sections 113L and 113R, which allows each of the first supporting unit 5A and the second supporting unit 5B to be held by the display unit 101 with enough strength not to be dropped by its weight. In addition, strongly pulling each of the first supporting unit 5A and the second supporting unit 5B makes it possible to individually remove the first supporting unit 5A and the second supporting unit 5B from the display unit 101. The neck 50 includes a bottom plate section 55 and a pair of side plate sections 53 and 54 that are provided to stand on the bottom plate section 55 and are separated from and opposed to each other in the X-axis direction. The arm 52 includes a first joining surface 52A to be joined to the bottom plate section 55 in the first installation state (FIG. 14A) and the second installation state (FIG. 15A) and a second joining surface 52B to be joined to the bottom plate section 55 in the third installation state and the fourth installation state (FIG. 16A). Joining between the bottom plate section 55 and the first joining surface 52A and joining between the bottom plate section 55 and the second joining surface 52B are performed, for example, by fastening by a screw N4.

To perform state change between the first installation state (FIGS. 14A and 14B) and the second installation state (FIGS. 15A and 15B), first, as illustrated in FIG. 14B or FIG. 15B, the screw N4 is temporarily removed to separate the bottom plate section 55 and the first joining surface 52A from each other. Thereafter, the base 51 and the arm 52 are rotated by 180° about a rotation axis J5A in the Y-axis direction in the horizontal plane (in the XZ plane), and thereafter, the bottom plate section 55 and the first joining surface 52A are joined together again. In this case, the screw N4 is inserted into the bottom plate section 55, and is screwed into a screw hole H52A of the first joining surface 52A.

To perform state change between the second installation state (FIGS. 15A and 15B) and the fourth installation state (FIGS. 16A and 16B), first, as illustrated in FIG. 15B or FIG. 16B, the screw N4 is temporarily removed to separate the bottom plate section 55 and the first joining surface 52A from each other or to separate the bottom plate section and the second joining surface 52B from each other. Furthermore, as illustrated in FIG. 16B, a screw N5 by which the base 51 and the arm 52 are fastened is temporarily removed to separate the base 51 and the arm from each other. It is to be noted that, in a case where a decorative cover 56 for hiding the screw N5 is mounted on the arm 52, the decorative cover 56 is removed to expose the screw N5. Thereafter, only the arm 52 is rotated by 90° in the vertical plane (in the XY plane), and thereafter, joining between the bottom plate section 55 and the second joining surface 52B or joining between the bottom plate section 55 and the first joining surface 52A is performed. In this case, the screw N4 is inserted into the bottom plate section 55, and is screwed into the screw hole H52A of the first joining surface 52A and a screw hole H52B of the second joining surface 52B. Furthermore, the base 51 and the arm 52 are fastened with use of the screw N5, and the decorative cover 56 is mounted on the arm 52. It is to be noted that switching between the first installation state (FIG. 13) and the third installation state may be performed in a similar manner. That is, the bottom plate section 55 and the first joining surface 52A or the second joining surface 52B are separated from each other, the base 51 and the arm 52 are separated from each other, and only the arm 52 is rotated by 90° in the vertical plane (in the XY plane). Thereafter, it is sufficient if joining between the bottom plate section 55 and the second joining surface 52B or the first joining surface 52A and joining between the base 51 and the arm 52 are performed.

[Workings and Effects of Display Apparatus 400]

As described above, according to the display apparatus 400 according to the present embodiment, the display unit 101 is stably supported by the stand 5 as the supporting body. In addition, in the display apparatus 400, the first to fourth installation states are configured to be selectable by rearrangement of the first supporting unit 5A and the second supporting unit 5B with respect to the display unit 101, which makes it possible to realize four viewing positions. This makes it possible to select a form of support to the display unit 1 in accordance with a user's purpose or preference, an installation environment, or the like.

Modification Example

FIG. 17A is a perspective view of an appearance of a supporting unit 6 as a modification example that is applicable to a stand of the display apparatus 400 according to the present embodiment. FIG. 17B is an exploded perspective view of the supporting unit 6 illustrated in FIG. 17A. As illustrated in FIGS. 17A and 17B, the supporting unit 6 includes a base 61, an arm 62, a prismatic shaft 63 that has, for example, a polygonal cross section and extends in the Z-axis direction, and a plate spring 64 that abuts on an outer surface of the shaft 63. The arm 62 has a through hole 62K into which the shaft 63 is inserted. The base 61 is divided into a first portion 61A and a second portion 62B, and a substantially columnar recessed portion into which an end of the shaft 63 is inserted is formed in each of the first portions 61A and the second portion 62B. The plate spring 64 is fixed to, for example, an inner surface of the recessed portion of the second portion 62B. The plate spring 64 locks rotation of the arm 62 by each predetermined angle. It is to be noted that although not illustrated in FIGS. 17A and 17B, the arm 62 is provided to be couplable to the neck 50 illustrated in FIG. 14A or the like. In other words, the supporting unit 6 has a configuration in which the base 51 and the arm 52 in the first supporting unit 5A are replaced with the base 61 and the arm 62. It is to be noted that in FIGS. 17A and 17B illustrate the shape of the arm 62 in a simplified manner.

In the first supporting unit 5A of the stand 5 according to the fourth embodiment described above, the base 51 and the arm 52 are configured to be separable, and are joined by fastening by the screw N5. In contrast, in the supporting unit 6 as the present modification example, the base 61 supports the arm 62 rotatably about a rotation axis J6 in its extending direction, e.g., the Z-axis direction in the XY plane. This makes it possible to optionally change an inclination angle of the arm 62 with respect to the placement surface FS without removing the arm 62 from the base 61. It is to be noted that the supporting unit 6 is applicable in place of the second supporting unit 5B according to the fourth embodiment described above.

Thus, in the supporting unit 6 as the present modification example, the arm 62 is rotated in the XY plane along the display surface 101A, which makes it possible to perform, for example, state change between the inward position and the outward position or state change between the low position and the high position.

5. Fifth Embodiment

[Configuration of Display Apparatus 500]

FIGS. 18A to 18C respectively illustrate entire configuration examples in first to third installation states of the display apparatus 500 according to a fifth embodiment of the present disclosure. FIGS. 18A to 18C are respectively perspective views of states of the display apparatus 500 in the first to third installation states as viewed from behind. The display apparatus 500 includes a display unit 201 and a stand 7 that supports the display unit 201.

(Display Unit 201)

A lower portion of a back surface 1B of the display unit 201 is provided with one mounting section 213L and one mounting section 213R for mounting the stand 7 respectively on the left and the right. The display unit 201 has a configuration substantially equal to that of the display unit 1 illustrated in FIGS. 1A to 1H except for this point.

(Stand 7)

As illustrated in each of FIGS. 18A to 18C, the stand 7 includes a first supporting unit 7A and a second supporting unit 7B. The first supporting unit 7A and the second supporting unit 7B are provided as different bodies. The first supporting unit 7A is detachably provided on at least the mounting section 213L. The second supporting unit 7B is detachably provided on at least the mounting section 213R.

The second supporting unit 7B is able to have substantially the same configuration as the first supporting unit 7A, except for having a configuration bilaterally symmetrical to that of the first supporting unit 7A. For this reason, the first supporting unit 7A is basically described below, and description of the second supporting unit 7B is omitted as appropriate.

FIG. 19A is a schematic view of the mounting section 213L and the first supporting unit 7A of the display apparatus 500 in the first installation state illustrated in FIG. 18A in an enlarged manner. It is to be noted that FIG. 19A illustrates a state as viewed from side of the first edge 1L. In addition, FIG. 19B is a schematic view of an attaching portion between the mounting section 213L and the first supporting unit 7A in the first installation state illustrated in FIG. 18A in a further enlarged manner. It is to be noted that FIG. 19B illustrates a state as viewed from side of the back surface 1B.

The first supporting unit 7A includes a neck 70 that is attachable on the mounting section 213L, a base 71 to be in contact with the placement surface FS, and an arm 72 that joins the neck 70 and the base 71 together. The neck 70 is, for example, a substantially prismatic object extending in the Z-axis direction, and includes a highly rigid material having a regular octagonal prism shape with first to eighth outer surfaces 701 to 708 (FIG. 19B). It is to be noted that in the first supporting unit 7A, the neck 70, the base 71, and the arm 72 may be integrally formed. In addition, the shape and size of a cross section of the neck 70, the shape and size of a cross section of the base 71, and the shape and size of a cross section of the arm 72 may be coincident with each other or may be different from each other. It is to be noted that the cross section here is a cross section orthogonal to an extending direction of each of the neck 70, the base 71, and the arm 72.

The mounting section 213L has, for example, a fitting hole U312 that forms a prismatic space extending from the back surface 1B to the display surface 1A. The fitting hole U213 has, for example, eight abutting surfaces S1 to S8 (FIG. 19B). It is to be noted that the mounting section 213R also has a fitting hole having a similar shape. As illustrated in FIG. 19B, in the first installation state, the abutting surfaces S1 to S8 of the fitting hole U213 respectively abut on the outer surfaces 701 to 708 of the neck 70. The second installation state illustrated in FIG. 18B is a state in which the neck 70 is rotated by 45° in a left direction on a paper surface with respect to the fitting hole U213 from the state illustrated in FIG. 19B. Accordingly, in the second installation state in FIG. 18B, the outer surfaces 701, 702, 703, 704, 705, 706, 707, and 708 of the neck 70 respectively abut on the abutting surfaces S8, S1, S2, S3, S4, S5, S6, and S7. Furthermore, the third installation state in FIG. 18C is a state in which the neck 70 is further rotated by 45° in the left direction on the paper surface with respect to the fitting hole U213 from the second installation state in FIG. 18B. In other words, the third installation state in FIG. 18C is a state in which the neck 70 is rotated by 90° in the left direction on the paper surface with respect to the fitting hole U213 from the state illustrated in FIG. 19B. Accordingly, in the third installation state in FIG. 18C, the outer surfaces 701, 702, 703, 704, 705, 706, 707, and 708 of the neck 70 respectively abut on the abutting surfaces S7, S8, S1, S2, S3, S4, S5, and S6.

In the display apparatus 500, for example, to perform change from the first installation state (FIG. 18A) to the second installation state (FIG. 18B), as illustrated in FIG. 20A, the first supporting unit 7A is removed in a −Z direction, and thereafter is rotated by 45° in the XY plane. Thereafter, as illustrated in FIG. 20B, the first supporting unit 7A is moved in a +Z direction to push the neck 70 into the fitting hole U213 of the mounting section 213L.

In addition, in the display apparatus 500, to perform, for example, change form the second installation state (FIG. 18B) to the third installation state (FIG. 18C), as illustrated in FIG. 21A, the first supporting unit 7A is removed in the −Z direction, and is further rotated by 45° in the XY plane. Thereafter, as illustrated in FIG. 21B, the first supporting unit 7A is moved in the +Z direction to push the neck 70 into the fitting hole U213 of the mounting section 213L.

Thus, in the display apparatus 500, changing the attitude of the stand 7 makes it possible to optionally and easily select any of the first to third installation states. It is to be noted that the first installation state in FIG. 18A is the outward low position, the second installation state in FIG. 18B is the high position, and the third installation state in FIG. 18C is the inward low position.

In the present embodiment, an example in which the cross section of the neck 70 has a regular octagonal prism shape has been described. Accordingly, it is possible to change an angle by every 45°. However, the shape of the cross section is optionally settable, and in a case of a regular dodecagonal shape, it is possible to change the angle by every 30°.

6. Other Modification Examples

Although the present disclosure has been described with reference to some embodiments, the present disclosure is not limited to the embodiments described above, and may be modified in a variety of ways. For example, size relationships, positional relationships, and shapes of the display units and the stands described in the first to fifth embodiments described above are merely illustrative, and the present disclosure is not limited thereto.

In addition, in the embodiments described above and the like, state change is performed without replacing the mounting position of the first supporting unit on the display unit and the mounting position of the second supporting unit on the display unit with each other; however, the present disclosure is not limited thereto. For example, in the display apparatus 200 according to the second embodiment, the arm 32 and the base 31 in the first supporting unit 3A may be joined to the neck 30 in the second supporting unit 3B to be mounted on the mounting section 113R, and the arm 32 and the base 31 in the second supporting unit 3B may be joined to the neck 30 in the first supporting unit 3A to be mounted on the mounting section 113L. The same applies to the display apparatus 300 according to the third embodiment.

Furthermore, for example, the display apparatuses described in the embodiments described above are not limited to a case where all described components are included, and some of the components may not be included, or any other component may be further included.

Thus, according to the supporting body and the display apparatus as one embodiment of the present disclosure, a plurality of installation states is configured to be selectable by rearrangement of the first supporting unit and the second supporting unit. This makes it possible to select a form of support to the display unit in accordance with a user's purpose or preference, an installation environment, or the like.

It is to be noted that the effects described herein are merely illustrative and non-limiting, and other effects may be provided. In addition, the present technology may have the following configurations.

(1)
A supporting body that supports a display unit including a display section, a first mounting section, and a second mounting section to cause the display unit to stand on a placement surface in a first direction, the display section having a display surface that spreads in each of the first direction and a second direction orthogonal to each other, and the first mounting section and the second mounting section being provided on the display section and disposed side by side in the first direction, the supporting body including:
a first supporting unit that is formed detachably on the first mounting section; and
a second supporting unit that is formed detachably on the second mounting section,
the first supporting unit and the second supporting unit being respectively mountable on the first mounting section and the second mounting section in a first state and a second state in which at least a portion of the first supporting unit and at least a portion of the second supporting unit are rotated in a first plane along the placement surface from the first state.

(2)
The supporting body according to (1), in which the first supporting unit and the second supporting unit are respectively mountable on the first mounting section and the second mounting section also in a third state and a fourth state, the third state in which the first supporting unit and the second supporting unit are moved in the second direction from the first state, and the fourth state in which the first supporting unit and the second supporting unit are moved in the second direction from the second state.

(3)
The supporting body according to (2), in which
the first supporting unit includes a first attaching section attachable on the first mounting section, and a first grounding section in contact with the placement surface, and
the second supporting unit includes a second attaching section attachable on the second mounting section, and a second grounding section in contact with the placement surface.

(4)
The supporting body according to (3), in which
the first attaching section and the first grounding section are integrally formed, and
the second attaching section and the second grounding section are integrally formed.

(5)
The supporting body according to any one of (1) to (4), in which the first supporting unit and the second supporting unit are further respectively mountable on the first mounting section and the second mounting section also in a third state and a fourth state, the third state in which at least the portion of the first supporting unit and at least the portion of the second supporting unit are rotated in a second plane along the display surface from the first state, and the fourth state in which at least the portion of the first supporting unit and at least the portion of the second supporting unit are rotated in the second plane from the second state.

(6)
The supporting body according to (5), in which states of the first supporting unit and the second supporting unit change between the third state and the fourth state by rotating at least the portion of the first supporting unit and at least the portion of the second supporting unit in the first plane.

(7)
The supporting body according to (6), in which
the first supporting unit includes a first attaching section attachable on the first mounting section, and a first grounding section in contact with the placement surface, and
the second supporting unit includes a second attaching section attachable on the second mounting section, and a second grounding section in contact with the placement surface.

(8)
The supporting body according to (7), in which
the first attaching section and the first grounding section are formed to be separable, and
the second attaching section and the second grounding section are formed to be separable.

(9)
The supporting body according to (8), in which
the first attaching section includes a first bottom section,
the second attaching section includes a second bottom section,
the first grounding section has a first joining surface to be joined to the first bottom section in the first state and the second state, and a second joining surface to be joined to the first bottom section in the third state and the fourth state, and
the second grounding section has a third joining surface to be joined to the second bottom section in the first state and the second state, and a fourth joining surface to be joined to the second bottom section in the third state and the fourth state.

(10)

The supporting body according to (9), in which state change between the first state and the third state and state change between the second state and the fourth state are performed by rotating both the first grounding section of the first supporting unit and the second grounding section of the second supporting unit in the second plane.

(11)

The supporting body according to (9) or (10), in which
the first grounding section includes a first arm and a first base, the first arm having the first joining surface and the second joining surface, and the first base being detachably provided on the first arm and having a first grounding surface in contact with the placement surface, and
the second grounding section includes a second arm and a second base, the second arm having the third joining surface and the fourth joining surface, and the second base being detachably provided on the second arm and having a second grounding surface in contact with the placement surface.

(12)

The supporting body according to (11), in which state change between the first state and the third state and state change between the second state and the fourth state are performed by rotating both the first arm of the first supporting unit and the second arm of the second supporting unit in the second plane.

(13)

The supporting body according to (8), in which
the first attaching section includes a first bottom section and a first side section,
the second attaching section includes a second bottom section and a second side section,
the first grounding section includes a first joining section that is to be joined to the first side section in the first state and the second state and be joined to the first bottom section in the third state and the fourth state, and
the second grounding section includes a second joining section that is to be joined to the second side section in the first state and the second state and be joined to the second bottom section in the third state and the fourth state.

(14)

The supporting body according to (13), in which state change between the first state and the third state and state change between the second state and the fourth state are performed by rotating both the first grounding section of the first supporting unit and the second grounding section of the second supporting unit in the second plane.

(15)

The supporting body according to (7), in which
the first grounding section rotatably supports the first attaching section in the second plane, and
the second grounding section rotatably supports the second attaching section in the second plane.

(16)

The supporting body according to (15), in which state change between the first state and the third state and state change between the second state and the fourth state are performed by rotating both the first attaching section and the second attaching in the second plane.

(17)

A supporting body that supports a display unit including a display section, a first mounting section, and a second mounting section to cause the display unit to stand on a placement surface in a first direction, the display section having a display surface that spreads in each of the first direction and a second direction orthogonal to each other, and the first mounting section and the second mounting section being provided on the display section and disposed side by side in the first direction, the supporting body including:
a first supporting unit that is formed detachably on the first mounting section; and
a second supporting unit that is formed detachably on the second mounting section,
the first supporting unit and the second supporting unit being respectively mountable on the first mounting section and the second mounting section in a first state and a second state in which at least a portion of the first supporting unit and at least a portion of the second supporting unit are rotated in a plane along the display surface from the first state.

(18)

The supporting body according to (17), in which
the first supporting unit includes a first attaching section attachable on the first mounting section, and a first grounding section in contact with the placement surface,
the second supporting unit includes a second attaching section attachable on the second mounting section, and a second grounding section in contact with the placement surface,
the first mounting section includes a first fitting section that is fittable with the first attaching section in both the first state and the second state, and
the second mounting section includes a second fitting section that is fittable with the second attaching section in both the first state and the second state.

(19)

The supporting body according to (18), in which
the first attaching section and the second attaching section each have
a first surface that is orthogonal to the display surface, and
a second surface that is orthogonal to the display surface and is inclined with respect to the first surface, and
the first fitting section and the second fitting section each have
a first abutting surface that abuts on the first surface in the first state,
a second abutting surface that abuts on the second surface in the first state,
a third abutting surface that abuts on the first surface in the second state, and
a fourth abutting surface that abuts on the second surface in the second state.

(20)

A display apparatus including:
a display unit including a display section, a first mounting section, and a second mounting section, the display section having a display surface that spreads in each of a first direction and a second direction orthogonal to each other, and the first mounting section and the second mounting section being provided on the display section and disposed side by side in the first direction; and
a supporting body that supports the display unit to cause the display unit to stand on a placement surface, the supporting body including
a first supporting unit that is formed detachably on the first mounting section, and
a second supporting unit that is formed detachably on the second mounting section,
the first supporting unit and the second supporting unit being respectively mountable on the first mounting section and the second mounting section in a first state and a second state in which at least a portion of the first supporting unit and at least a portion of the second supporting unit are rotated in a first plane along the placement surface from the first state.

(21)
A display apparatus including:
a display unit including a display section, a first mounting section, and a second mounting section, the display section having a display surface that spreads in each of a first direction and a second direction orthogonal to each other, and the first mounting section and the second mounting section being provided on the display section and disposed side by side in the first direction; and
a supporting body that supports the display unit to cause the display unit to stand on a placement surface,
the supporting body including
a first supporting unit that is formed detachably on the first mounting section, and
a second supporting unit that is formed detachably on the second mounting section,
the first supporting unit and the second supporting unit being respectively mountable on the first mounting section and the second mounting section in a first state and a second state in which at least a portion of the first supporting unit and at least a portion of the second supporting unit are rotated in a plane along the display surface from the first state.

This application claims the priority on the basis of Japanese Patent Application No. 2020-170685 filed with Japan Patent Office on Oct. 8, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A supporting body that supports a display unit including a display section, a first mounting section, and a second mounting section to cause the display unit to stand on a placement surface in a first direction, the display section having a display surface that spreads in each of the first direction and a second direction orthogonal to each other, and the first mounting section and the second mounting section being provided on the display section and disposed side by side in the first direction, the supporting body comprising:
a first supporting unit that is formed detachably on the first mounting section; and
a second supporting unit that is formed detachably on the second mounting section,
the first supporting unit and the second supporting unit being respectively mountable on the first mounting section and the second mounting section in a first state and a second state in which the first supporting unit and the second supporting unit are rotated parallel to the display surface along the placement surface from the first state such that the contact surface area between the first supporting unit and the second supporting unit with the placement surface is the same from the first state to the second state.

2. The supporting body according to claim 1, wherein the first supporting unit and the second supporting unit are respectively mountable on the first mounting section and the second mounting section also in a third state and a fourth state, the third state in which the first supporting unit and the second supporting unit are moved in the second direction from the first state, and the fourth state in which the first supporting unit and the second supporting unit are moved in the second direction from the second state.

3. The supporting body according to claim 2, wherein
the first supporting unit includes a first attaching section attachable on the first mounting section, and a first grounding section in contact with the placement surface, and
the second supporting unit includes a second attaching section attachable on the second mounting section, and a second grounding section in contact with the placement surface.

4. The supporting body according to claim 3, wherein
the first attaching section and the first grounding section are integrally formed, and
the second attaching section and the second grounding section are integrally formed.

5. The supporting body according to claim 1, wherein the first supporting unit and the second supporting unit are further respectively mountable on the first mounting section and the second mounting section also in a third state and a fourth state, the third state in which at least the portion of the first supporting unit and at least the portion of the second supporting unit are rotated in a second plane along the display surface from the first state, and the fourth state in which at least the portion of the first supporting unit and at least the portion of the second supporting unit are rotated in the second plane from the second state.

6. The supporting body according to claim 5, wherein states of the first supporting unit and the second supporting unit change between the third state and the fourth state by rotating at least the portion of the first supporting unit and at least the portion of the second supporting unit in a first plane parallel to the display surface.

7. The supporting body according to claim 6, wherein
the first supporting unit includes a first attaching section attachable on the first mounting section, and a first grounding section in contact with the placement surface, and
the second supporting unit includes a second attaching section attachable on the
second mounting section, and a second grounding section in contact with the placement surface.

8. The supporting body according to claim 7, wherein
the first attaching section and the first grounding section are formed to be separable, and
the second attaching section and the second grounding section are formed to be separable.

9. The supporting body according to claim 8, wherein
the first attaching section includes a first bottom section,
the second attaching section includes a second bottom section,
the first grounding section has a first joining surface to be joined to the first bottom section in the first state and the second state, and a second joining surface to be joined to the first bottom section in the third state and the fourth state, and the second grounding section has a third joining surface to be joined to the second bottom section in the first state and the second state, and a fourth joining surface to be joined to the second bottom section in the third state and the fourth state.

10. The supporting body according to claim 9, wherein state change between the first state and the third state and state change between the second state and the fourth state are performed by rotating both the first grounding section of the first supporting unit and the second grounding section of the second supporting unit in the second plane.

11. The supporting body according to claim 9, wherein
the first grounding section includes a first arm and a first base, the first arm having the first joining surface and the second joining surface, and the first base being detachably provided on the first arm and having a first grounding surface in contact with the placement surface, and
the second grounding section includes a second arm and a second base, the second arm having the third joining surface and the fourth joining surface, and the second base being detachably provided on the second arm and having a second grounding surface in contact with the placement surface.

12. The supporting body according to claim 11, wherein state change between the first state and the third state and state change between the second state and the fourth state are performed by rotating both the first arm of the first supporting unit and the second arm of the second supporting unit in the second plane.

13. The supporting body according to claim 8, wherein
the first attaching section includes a first bottom section and a first side section,
the second attaching section includes a second bottom section and a second side section,
the first grounding section includes a first joining section that is to be joined to the first side section in the first state and the second state and be joined to the first bottom section in the third state and the fourth state, and
the second grounding section includes a second joining section that is to be joined to the second side section in the first state and the second state and be joined to the second bottom section in the third state and the fourth state.

14. The supporting body according to claim 13, wherein state change between the first state and the third state and state change between the second state and the fourth state are performed by rotating both the first grounding section of the first supporting unit and the second grounding section of the second supporting unit in the second plane.

15. The supporting body according to claim 7, wherein
the first grounding section rotatably supports the first attaching section in the second plane, and
the second grounding section rotatably supports the second attaching section in the second plane.

16. The supporting body according to claim 15, wherein state change between the first state and the third state and state change between the second state and the fourth state are performed by rotating both the first attaching section and the second attaching in the second plane.

17. A supporting body that supports a display unit including a display section, a first mounting section, and a second mounting section to cause the display unit to stand on a placement surface in a first direction, the display section having a display surface that spreads in each of the first direction and a second direction orthogonal to each other, and the first mounting section and the second mounting section being provided on the display section and disposed side by side in the first direction, the supporting body comprising:
a first supporting unit that is formed detachably on the first mounting section; and
a second supporting unit that is formed detachably on the second mounting section,
the first supporting unit and the second supporting unit being respectively mountable on the first mounting section and the second mounting section in a first state and a second state in which the first supporting unit and the second supporting unit are rotated in a plane along the display surface from the first state such that the contact surface area between the first supporting unit and the second supporting unit with the placement surface is the same from the first state to the second state.

18. The supporting body according to claim 17, wherein
the first supporting unit includes a first attaching section attachable on the first mounting section, and a first grounding section in contact with the placement surface,
the second supporting unit includes a second attaching section attachable on the second mounting section, and a second grounding section in contact with the placement surface,
the first mounting section includes a first fitting section that is fittable with the first attaching section in both the first state and the second state, and
the second mounting section includes a second fitting section that is fittable with the second attaching section in both the first state and the second state.

19. The supporting body according to claim 18, wherein
the first attaching section and the second attaching section each have a first surface that is orthogonal to the display surface, and
a second surface that is orthogonal to the display surface and is inclined with respect to the first surface, and
the first fitting section and the second fitting section each have a first abutting surface that abuts on the first surface in the first state,
a second abutting surface that abuts on the second surface in the first state,
a third abutting surface that abuts on the first surface in the second state, and
a fourth abutting surface that abuts on the second surface in the second state.

20. A display apparatus comprising:
a display unit including a display section, a first mounting section, and a second mounting section, the display section having a display surface that spreads in each of a first direction and a second direction orthogonal to each other, and the first mounting section and the second mounting section being provided on the display section and disposed side by side in the first direction; and
a supporting body that supports the display unit to cause the display unit to stand on a placement surface, the supporting body including
a first supporting unit that is formed detachably on the first mounting section, and
a second supporting unit that is formed detachably on the second mounting section, the first supporting unit and the second supporting unit being respectively mountable on the first mounting section and the second mounting section in a first state and a second state in which the first supporting unit and the second supporting unit are rotated parallel to the display surface along the placement surface from the first state such that the contact surface area between the first supporting unit and the second supporting unit with the placement surface is the same from the first state to the second state.

21. A display apparatus comprising:

a display unit including a display section, a first mounting section, and a second mounting section, the display section having a display surface that spreads in each of a first direction and a second direction orthogonal to each other, and the first mounting section and the second mounting section being provided on the display section and disposed side by side in the first direction; and a supporting body that supports the display unit to cause the display unit to stand on a placement surface, the supporting body including a first supporting unit that is formed detachably on the first mounting section, and a second supporting unit that is formed detachably on the second mounting section, the first supporting unit and the second supporting unit being respectively mountable on the first mounting section and the second mounting section in a first state and a second state in which the first supporting unit and the second supporting unit are rotated in a plane along the display surface from the first state such that the contact surface area between the first supporting unit and the second supporting unit with the placement surface is the same from the first state to the second state.

* * * * *